(12) United States Patent
Huynh et al.

(10) Patent No.: US 11,379,555 B2
(45) Date of Patent: Jul. 5, 2022

(54) DILATED CONVOLUTION USING SYSTOLIC ARRAY

(71) Applicant: Amazon Technologies, Inc., Seattle, WA (US)

(72) Inventors: Jeffrey T. Huynh, San Jose, CA (US); Ron Diamant, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 469 days.

(21) Appl. No.: 16/457,503

(22) Filed: Jun. 28, 2019

(65) Prior Publication Data

US 2020/0410036 A1    Dec. 31, 2020

(51) Int. Cl.
| | |
|---|---|
| *G06F 17/15* | (2006.01) |
| *G06V 10/75* | (2022.01) |
| *G06F 15/80* | (2006.01) |
| *G06V 30/413* | (2022.01) |
| *H04L 49/9047* | (2022.01) |

(52) U.S. Cl.
CPC ........ *G06F 17/153* (2013.01); *G06F 15/8046* (2013.01); *G06V 10/7515* (2022.01); *G06V 30/413* (2022.01); *H04L 49/9047* (2013.01)

(58) Field of Classification Search
CPC combination set(s) only.
See application file for complete search history.

(56) References Cited

U.S. PATENT DOCUMENTS

| | | | |
|---|---|---|---|
| 2018/0336165 A1* | 11/2018 | Phelps | G06N 3/063 |
| 2019/0114499 A1* | 4/2019 | Delaye | G06F 3/0683 |
| 2019/0236049 A1* | 8/2019 | Vantrease | G06N 3/02 |
| 2019/0244106 A1* | 8/2019 | Franca-Neto | G06N 3/04 |
| 2019/0294413 A1* | 9/2019 | Vantrease | G06F 7/5095 |
| 2019/0311243 A1* | 10/2019 | Whatmough | G06N 3/04 |

OTHER PUBLICATIONS

Dongseok Im, "DT-CNN: Dilated and Transposed Convolution Neural Network Accelerator for Real-time Image Segmentation on Mobile Devices", Jan. 5, 2019, 2019 IEEE International Symposium on Circuits and Systems (ISCAS), pp. 1-5.*

(Continued)

*Primary Examiner* — Omar S Ismail
(74) *Attorney, Agent, or Firm* — Kilpatrick Townsend & Stockton LLP

(57) ABSTRACT

In one example, a non-transitory computer readable medium stores instructions that, when executed by one or more hardware processors, cause the one or more hardware processors to: load a first weight data element of an array of weight data elements from a memory into a systolic array; select a subset of input data elements from the memory into the systolic array to perform first computations of a dilated convolution operation, the subset being selected based on a rate of the dilated convolution operation and coordinates of the weight data element within the array of weight data elements; and control the systolic array to perform the first computations based on the first weight data element and the subset to generate first output data elements of an output data array. An example of a compiler that generates the instructions is also provided.

19 Claims, 21 Drawing Sheets

(56) References Cited

OTHER PUBLICATIONS

Wenjian Liu,"USCA: A Unified Systolic Convolution Array Architecture for Accelerating Sparse Neural Network," May 1, 2019, 2019 IEEE International Symposium on Circuits and Systems (ISCAS),pp. 1-4.*

Tayfun Gokmen,"Training Deep Convolutional Neural Networks with Resistive Cross-Point Devices," Oct. 10, 2017,Frontiers in Neuroscience,vol. 11, Article 538, pp. 1-9.*

Yu-Sheng Lin,"MERIT: Tensor Transform for Memory-Efficient Vision Processing on Parallel Architectures,"Dec. 6, 2019, IEEE Transactions on Very Large Scale Integration (VLSI) Systems, vol. 28, No. 3, Mar. 2020, pp. 791-800.*

Yufei Ma,"Algorithm-Hardware Co-Design of Single Shot Detector for Fast Object Detection on FPGAs,"Jan. 3, 2019,2018 IEEE/ACM International Conference on Computer-Aided Design (ICCAD),pp. 1-5.*

Vincent Dumoulin,"A guide to convolution arithmetic for deep learning,"Jan. 11, 2018,https://arxiv.org/abs/1603.07285,pp. 20-29.*

Im et al., "DT-CNN: Dilated and Transposed Convolution Neural Network Accelerator for Real-time Image Segmentation on Mobile Devices," IEEE International Symposium on Circuits and Systems (ISCAS), 2019, 5 pages.

WO Application No. PCT/US2020/039778, International Search Report and Written Opinion, dated Oct. 13, 2020, 12 pages.

* cited by examiner

| Weight data elements coordinates | (0, 0) | (1, 1) | (2, 2) |
|---|---|---|---|
| Start Address | Address of input data element (1, 1) | Address of input data element (0, 0) | Address of input data element (1, 1) |
| Number of fetch elements | 18 | 30 | 27 |
| step | 2 | 2 | 2 |
| Destination offset | 11 | 0 | 0 |
| Number of write elements | 18 | 30 | 27 |
| step | 1 | 1 | 1 |

FIG. 5D

| Weight data elements coordinates at original filter array 504 | (0, 0) | (1, 1) | (2, 2) |
|---|---|---|---|
| Weight data elements coordinates at zero-padded filter array 504 | (0, 0) | (2, 2) | (4, 4) |
| Start Address | Address of input data element (1, 1) | Address of input data element (1, 1) | Address of input data element (3, 3) |
| Number of fetch elements | 18 | 27 | 24 |
| step | 2 | 2 | 2 |
| Destination offset | 11 | 0 | 0 |
| Number of write elements | 18 | 27 | 24 |
| step | 1 | 1 | 1 |

DILATED CONVOLUTION USING SYSTOLIC ARRAY

BACKGROUND

Artificial neural networks are computing systems with an architecture based on biological neural networks. Artificial neural networks can be trained, using training data, to learn about how to perform a certain computing task for an application.

A hardware accelerator, such as a neural network processor, can be programmed to implement an artificial neural network to perform the computing task. One common computing task is a convolution operation between a weight data matrix and an input data matrix. In a convolution operation, the weight data matrix can traverse through and superimpose with the input data matrix in multiple strides until the entire input data matrix has been traversed. For each stride, a sum of multiplications between the weight data matrix and the superimposed portions of the input data matrix can be generated as an output of the convolution operation, and multiple outputs of the convolution operation can be generated at the multiple strides. There are many applications of convolution operation, such as extracting features from an image, performing image recognition, etc.

To reduce the computation cost for a convolution operation between the weight data matrix and a large input data matrix (e.g., an image having a large number of pixels), a dilated convolution operation can be performed. In a dilated convolution operation, the footprint of the weight data matrix can be enlarged by inserting a number of zeros between elements of the weight data matrix. With the enlarged weight data matrix, the number of strides needed to complete traversal of the input data matrix can be reduced. If the hardware accelerator also includes hardware to bypass multiplication and addition operations involving zeros, the total number of arithmetic operations can also be reduced. The reduction in the arithmetic operations, however, can be offset by additional latency introduced by other operations (e.g., memory operations) associated with the dilated convolution operation, which can reduce the efficiency improvement brought about by the dilated convolution operation.

BRIEF DESCRIPTION OF THE DRAWINGS

Various embodiments in accordance with the present disclosure will be described with reference to the drawings, in which:

FIGS. 5A-5D illustrate operations at the example neural network processor of FIGS. 4A-4C for a normal convolution operation, according to certain aspects of the present disclosure;

FIGS. 6A-6C illustrate operations at the example neural network processor of FIGS. 4A-4C for a dilated convolution operation, according to certain aspects of the present disclosure;

DETAILED DESCRIPTION

Figure 1:
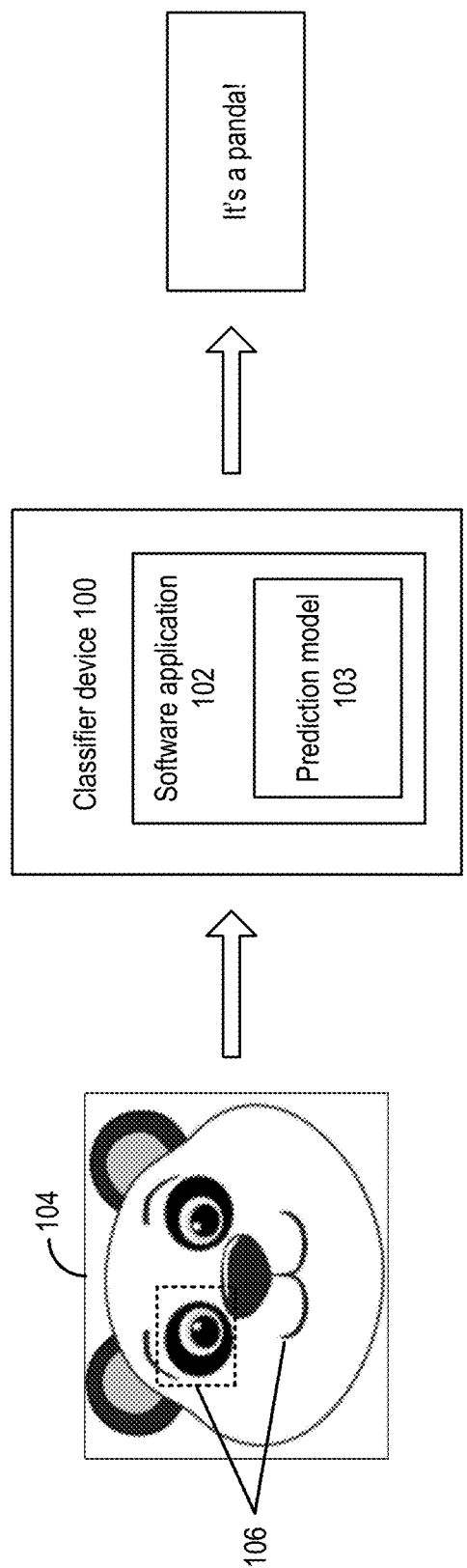
FIG. 1 illustrates an example a classifier device that uses techniques disclosed herein to process data.

Examples of the present disclosure relate to neural network processing, and more specifically, to performing a dilated convolution operation at a neural network processor, as well as hardware and/or software systems to support the dilated convolution operation at the neural network processor.

A hardware accelerator, such as a neural network processor, can be programmed to implement an artificial neural network to perform a computing task. One common computing task is a convolution operation between a weight data matrix configured as a filter and an input data matrix. The input data matrix can correspond to pixels of an image, whereas the filter can include an array of filter coefficients configured to extract a target feature from the image. As part of the convolution operation, the filter can traverse through different locations of the image in multiple strides. At each stride location, a sum of products between each filter coefficient and an overlapping pixel of the image can be generated as a convolution output for that stride location. The convolution output can indicate, for example, whether the image contains the target feature, the image location of the target feature, etc. As the convolution operation requires performing a number of arithmetic operations (e.g., multiplication and addition operations) at each stride location, the convolution operation can be quite compute-intensive, especially when involving a large image having lots of pixels.

To reduce the computation cost for a convolution operation, a dilated convolution operation can be performed. In a dilated convolution operation, the footprint of the weight data matrix can be enlarged by inserting a number of zeros between elements of the weight data matrix. The number of zeros can be based on a rate of the dilated convolution. For example, with a rate of two, one zero is inserted between elements of the weight data matrix, whereas with a rate of four, three zeros are inserted between elements of the weight data matrix. With the enlarged weight data matrix, the number of strides needed to complete traversal of the input data matrix can be reduced. If the hardware accelerator also includes hardware to bypass multiplications and additions involving zeros, the number of arithmetic operations at each stride can be the same or similar to a normal (non-dilated) convolution. With the number of strides reduced, the total number of arithmetic operations involved in the dilated convolution operation can be reduced, and the efficiency of the dilated convolution operation can be improved.

Although a dilated convolution operation can reduce the total number of arithmetic operations, the reduction in the computation cost can be offset by other operations, such as memory operations, associated with the dilated convolution operation. As an example, to perform dilated convolution, groups of elements of the image that superimpose with the non-zero elements of the expanded weight data matrix for different stride locations in the dilated convolution operation can be read from a memory and stored at a different location in the memory. Each groups of elements can be read from the memory and multiplied with the non-zero elements of the expanded weight data matrix to generate products, and the products can be summed to generate an output. The outputs can be rearranged in the memory to construct the output data array. The additional memory read/write operations can add latency to the dilated convolution operation and offset the efficiency improvement brought about by the dilated convolution operation.

In some examples of the present disclosure, the neural network processor comprises a memory, a systolic array, and a controller. The memory can store input data elements of an input data array and weight data elements of a weight data array. Both the input data array and weight data array can be multi-dimensional. For example, the input data array can include one or more two-dimensional input data matrices, with each input data matrix corresponding to an input channel. Moreover, the weight data array can include one or more two-dimensional weight data matrices, with each weight data matrix corresponding to an input channel and an output channel. The input data elements can be stored in addresses in the memory based on their coordinates in the input data array, whereas the weight data elements can be stored in the addresses in the memory based on their coordinates in the weight data array.

To perform a dilated convolution operation, the controller can obtain a first weight data element from the memory into the systolic array, and then load a first subset of the input data elements into the systolic array to be multiplied with the first weight data element. The first subset of the input data elements loaded into the systolic array can represent the input data elements that overlap with the first weight data element when the weight data array is at different stride locations over the input data array. The systolic array can repeat these operations for other weight data elements to generate other partial sums, and control the summation buffer to accumulate the partial sums to generate the output data elements of the dilated convolution. The summation buffer can then store the output data elements back to the memory to construct an output data array of the dilated convolution.

As described above, each subset of input data elements can be selected based on determining input data elements that overlap with a weight data element ("overlapping input data elements") in the dilated convolution operation. The determination of the overlapping input data elements for a weight data element can be performed by a compiler, which can encode the overlapping input data elements information in instructions. The controller can then execute the instructions to perform the selection. The compiler can determine the overlapping input data elements based on a projection operation. The dimensions of the summation buffer (e.g., numbers of columns and rows) can define an output tile comprising output data elements of a first region in the output data array. The first region can be defined by a range of actual coordinates in the output data array. Based on a projection operation, which takes into the first region of output data array coordinates and a stride of the dilated convolution, the compiler can determine a second region comprising input data elements to be convolved with the first weight data element. The second region can be defined by a range of target coordinates of input data elements. The second region (and the range of target coordinates) can be shifted by an offset based on the coordinates of the first weight data element in the weight data array and a scaling factor based on the rate of the dilated convolution operation. The compiler can then align a stride pattern with the shifted second region to identify locations of the second region that overlap with the stride pattern. The stride pattern defines locations of input data elements that overlaps with the weight data element and reflects the stride of the dilated convolution operation. Based on the overlap, the compiler can determine a set of target coordinates of the overlapping input data elements. The projection operation also can be performed for different input channels to identify overlapping input data elements in other input channels.

After determining the set of target coordinates of the overlapping input data elements for the first weight data element, the compiler can perform a coordinates-to-address mapping operation to determine the addresses of a first subset of input data elements in the memory, and provide the addresses in the instructions to allow the controller to obtain the first subset of input data elements from the memory. The compiler can perform the aforementioned projection operation for each weight data element to generate an instruction for the respective weight data element, with each instruction including the addresses of the subset of input data elements to be convolved with the respective weight data element.

Examples of the present disclosure can improve the efficiency of a neural network processor in performing a dilated convolution operation by reducing memory operations. For example, compared with a case where the overlapping input data elements are read from the memory and then stored at different locations in the memory, and then read again from the different locations in the memory to perform the dilated convolution, the neural network processor according to examples of the present disclosure is provided with addresses of the overlapping input data elements and uses the addresses to selectively read the overlapping input data elements from the memory, and fetch the input data elements to the systolic array. The neural network processor does not need to perform additional memory write operations to write the overlapping input data elements back to the memory. Moreover, as the summation buffer can store the output data elements at pre-determined locations in the memory to reconstruct the output data array, the output data elements need not be rearranged in the memory to construct the output data array. All these can reduce the number of memory operations, which can reduce the memory access latency and improve the speed of the dilated convolution operation.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example classifier device 100 that uses techniques disclosed herein to process data. Classifier device 100 can be, for example, a computing device operating a software application 102 and a prediction model 103 to predict information included in a data sequence, and perform a predetermined function based on the prediction. For example, classifier device 100 can be part of an image recognition service provided to identify certain objects (e.g., text, a person, etc.) from an image. It is understood that the image recognition service is merely provided as an illustrative example, and that techniques disclosed herein can be used for other data processing applications including, for example, text-based data processing (e.g., processing of search queries), audio data processing, etc. Moreover, classifier device 100 may operate a number of different prediction models to process different input data, either in parallel or at different times.

In some examples, the image recognition service can be provided in a multi-tenant compute service system. The multi-tenant compute service system may typically include a plurality of servers that can host data and be used by multiple clients or organizations to run instances, such as virtual machine instances or bare-metal instances (e.g., operating systems that run directly on the server hardware). In most instances, such as bare-metal or virtual machine instances, a multi-tenant compute service system may be allocated to a client when the client needs them and decommissioned when they are no longer needed, such that the resources can be reallocated to other clients. In the present disclosure, the terms "tenant," "client," and "customer" may be used interchangeably, although such terms do not necessarily imply the existence of any particular business arrangement. The term "instance" may refer to, for example, an instance that is executed directly on server hardware or as a virtual machine. Different types of instances generally correspond to different hardware functions and/or arrangements of hardware (e.g., different amounts of available memory and/or processing hardware). In the example of FIG. 1, the multi-tenant compute service system may provide the image recognition service when the client needs it, and the service is decommissioned when it is no longer needed, such that the resources supporting the image recognition service (e.g., access to software application 102, and the underlying hardware resources for processing software application 102) can be reallocated to other clients. Different clients (or one client) may request application 102 to perform processing of different input data using the same or different prediction models including prediction model 103.

In the example of FIG. 1, software application 102 can receive pixel data of an image 104 from a user. Image 104 may include an array of pixels. Software application 102 can perform analysis on the pixel data, and predict one or more objects 106 depicted in image 104. The analysis may include, for example, comparing the pixel data against a set of predetermined features data. The predetermined features data may include data associated with a set of predetermined visual image features such as, for example, a nose object, a mouth object, etc. The predetermined features data may also include data associated with non-visual image features, or a combination of visual and non-visual image features. As to be discussed in more detail below, software application 102 may employ prediction model 103 to compute a set of scores based on the pixel data of image 104. The set of scores may represent, for example, the likelihood of image 104 including the image features represented by the features data. Software application 102 can then determine other information about the content of image 104 based on the scores. For example, based on the scores, software application 102 can determine that image 104 is an image of, for example, a panda, a cat, or other objects. The present disclosure provides examples of techniques to allow trade-off between speed and precision of operating prediction model 103, as to be discussed below.

Figure 2A:
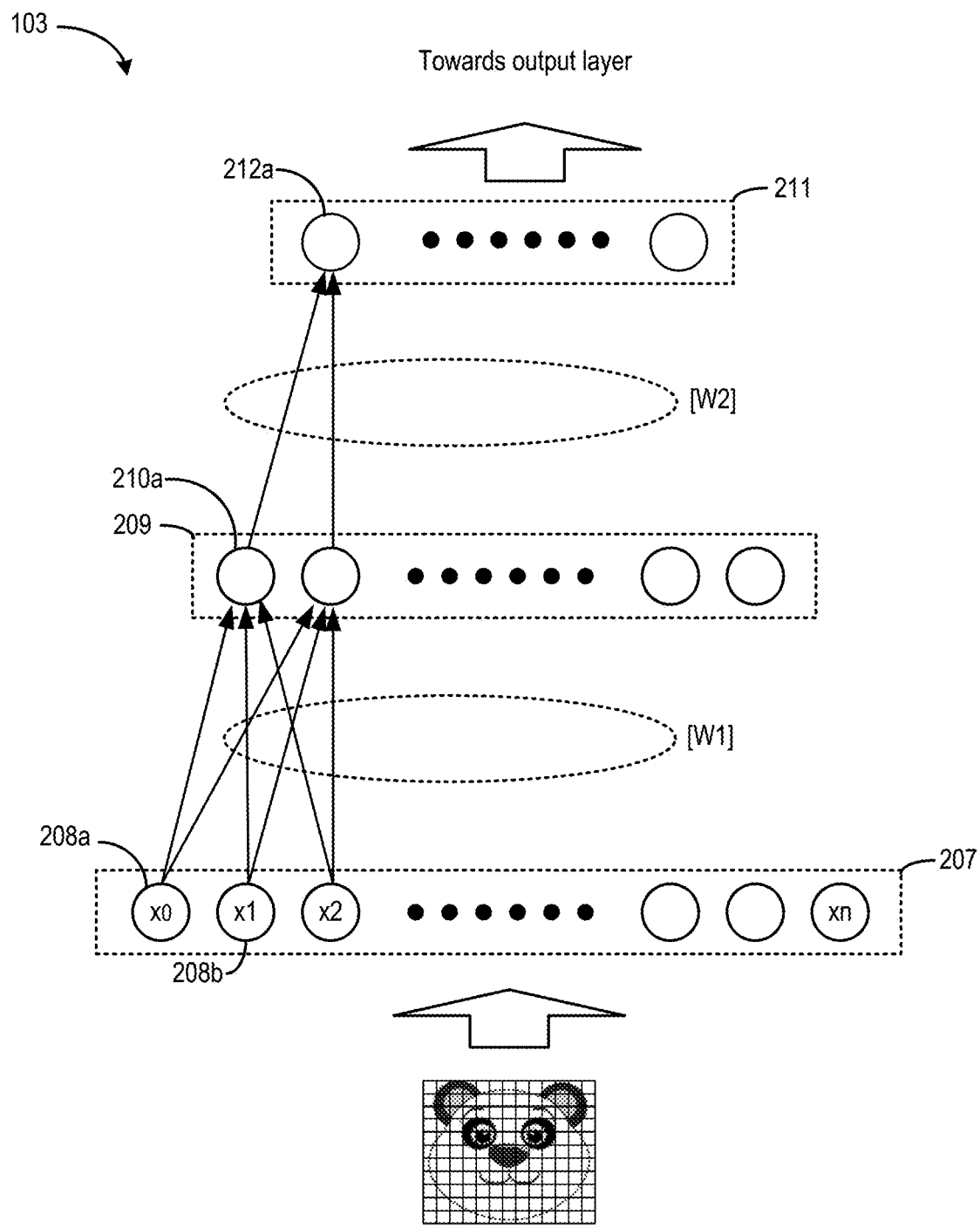
FIGS. 2A-2E are simplified block diagrams illustrating a prediction model and the computations that use techniques disclosed herein, according to certain aspects of the present disclosure.

Prediction model 103 can be in the form of an artificial neural network. The artificial neural network may include a plurality of processing nodes, with each processing node configured to process part of the input pixel data, or to further process the intermediate outputs from other processing nodes. FIG. 1 illustrates an example of prediction model 103 that uses techniques disclosed herein. In FIG. 1, prediction model 103 may be a multi-layer neural network such as a deep neural network (DNN), a convolutional neural network (CNN), etc. Prediction model 103 may include an input layer 207, a set of intermediate layers including intermediate layers 209 and 211, and an output layer (not shown in FIG. 2A). It is understood that prediction model 103 can also include other different types of neural networks including, for example, long short-term memory (LSTM), multilayer perception (MTP), multiscale densenet (MSD-NET), etc.

Layer 207 may process pixel data representing different portions of image 104. For example, in the example of FIG. 2A, layer 207 may process the pixel data of image 204. Each processing node of layer 207 is assigned to receive a pixel value (e.g., $x_0, x_1, x_2, \ldots x_n$) corresponding to a predetermined pixel within image 104, and transmit one or more weights with the received pixel value to layer 209. In a case where prediction model 203 is a DNN, each processing node of layer 207 can be assigned a set of weights defined based on a matrix W1. Each processing node of layer 207 can send the received pixel value and the assigned weights to each processing node of layer 209. In a case where prediction model 103 is a CNN, groups of the processing nodes of layer 207 may share a set of weights, and each group may send the set of weights and the pixel values received by the group of processing nodes to a single processing node of layer 209. Different neural network models may include different topologies (e.g., including a different number of layers, different connections between layers, etc.), and/or include a different set of weights for each layer.

Layer 209 may process the scaled outputs from layer 207 to generate a set of intermediate outputs. For example, assuming processing node 210a of layer 209 is connected to n processing nodes in layer 207, processing node 210a may generate a sum of the scaled outputs received from layer 207 based on the following equation:

$$\text{sum}_{210a} = \Sigma_{i=0}^{n}(W1_i \times x_i) \quad \text{(Equation 1)}$$

Here, $\text{sum}_{210a}$ represents an intermediate output generated by processing node 210a. $W1_i \times x_i$ represents a scaling of a particular pixel value (e.g., $x_0$) with the associated weight (e.g., $W1_0$) by a processing node of layer 207. In a case where prediction model 103 is a DNN, each processing node of layer 209 may generate the sum based on the scaling of pixel values from each processing node of layer 207, and then generate a sum (e.g., $\text{Sum}_{210a}$) by summing the scaled pixel values. The sum may also represent a dot-product between an input vector comprising a number of elements (e.g., pixel values) and a weight vector (e.g., W1). In some examples, a bias can also be added the scaled outputs to generate the intermediate output.

Figure 2B:
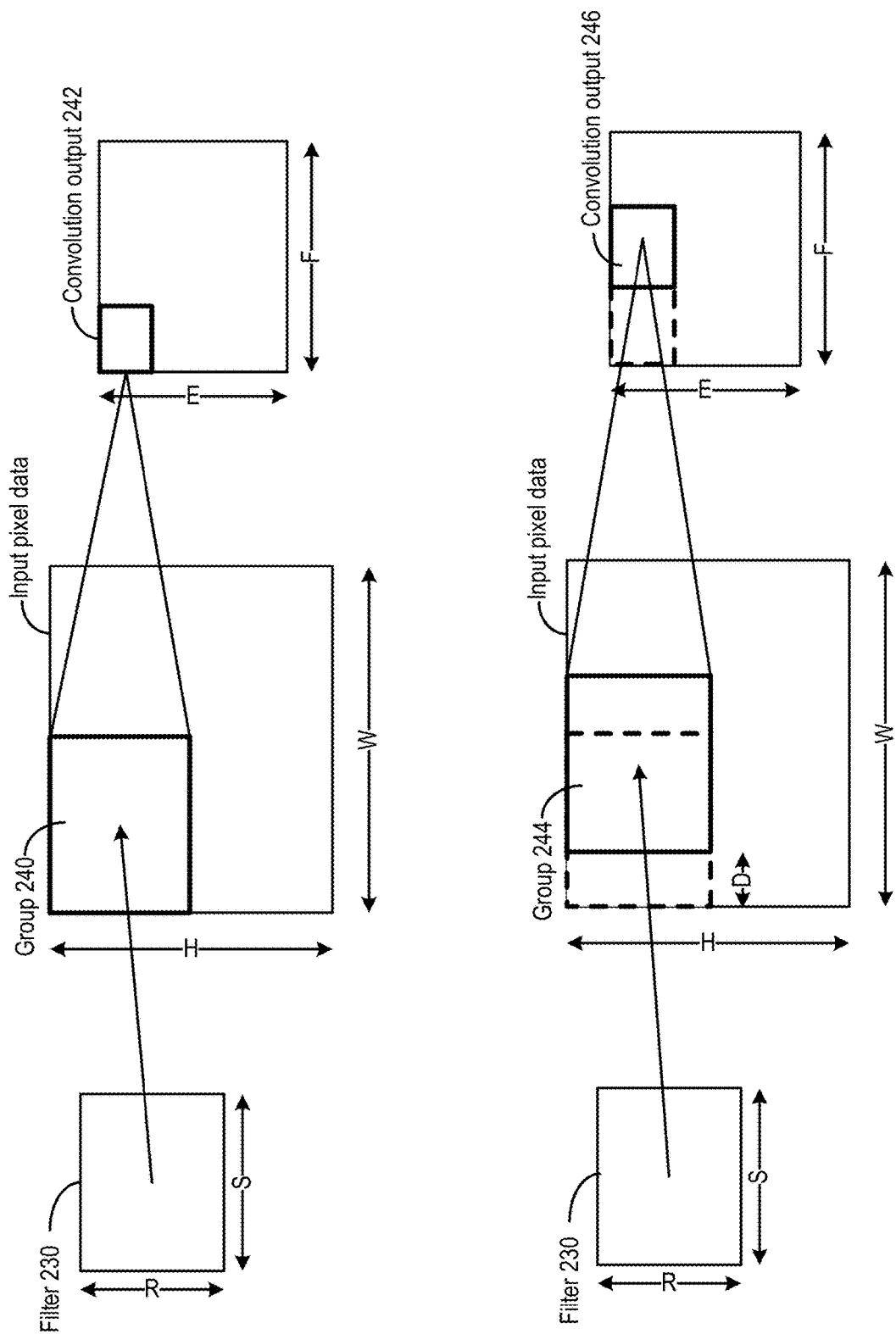

In a case where prediction model 103 is a CNN, each processing node of layer 209 may generate the intermediate output based on the scaling of pixel values from a group of processing nodes of layers 207. The intermediate output may represent a convolution result between a group of pixel values and a filter comprising the weight values. FIG. 2B illustrates an example of a convolution operation that layer 209 may perform. In FIG. 2B, filter 230 may include a two-dimensional array of weights. The weights in filter 230 may represent a spatial distribution of pixels for certain features to be detected from the image. The two-dimensional array may have a height of R rows and a width of S columns, and is typically smaller than an input image with a height of H pixels and a width of W pixels. Each weight may be mapped to a pixel in a rectangular block of pixel values with the same R rows and S columns. A processing node of layer 209 (e.g., processing node 210a) can receive, from a group of processing nodes of input layer 207, a group 240 of pixel values corresponding to a first rectangular block of pixels from the input image, which corresponds to a first stride location of filter 230, and generate a convolution output 242 based on a summation of multiplication results between each weight of filter 230 and each corresponding pixel in group 240 according to Equation 1, to generate a dot-product between a matrix represented by filter 230 and a matrix represented by group 240. Another processing node of layer 209 can also receive, from another group of processing nodes of input layer 207, a group 244 of pixel values corresponding to a second rectangular block of pixels from the input image corresponding to a second stride location of filter 230, and generate a convolution output 246 based on a summation of multiplication results between each weight of filter 230 and each corresponding pixel in group 244 according to Equation 1, to generate a dot-product between the matrix of filter 230 and a matrix represented by group 240. In some examples, each convolution output in FIG. 2B (e.g., convolution output 242, convolution output 346, etc.) can correspond to the output of a processing node of layer 209. In some examples, the pixel data in the input image may be referred to as an input feature map to indicate that the pixels are processed by the same filter (or same sets of filters) corresponding to certain feature(s). The convolution outputs may be referred to as an output feature map to indicate that the output is the result of processing an input feature map with the filter.

As shown in FIG. 2B, the convolution operations can be arranged in a sliding-window such that the second rectangular block overlaps, or is otherwise adjacent to, the first rectangular block in the input image. For example, in the example of FIG. 2B, D may be a distance of stride (in pixel) of the sliding-window for each convolution operation, such that the block of pixels corresponding to group 244 may be situated at a distance D (in terms of pixels) from the block of pixels corresponding to group 240, and the next block of pixels may also be situated at the same distance D from group 244. Other processing nodes of layer 209 may also receive groups of pixels corresponding to other rectangular blocks and generate other intermediate outputs. The convolution outputs can be part of a convolution output array. The array of convolution outputs can have a smaller height and a smaller width than the input image. Rectangular blocks of the convolution outputs can be further grouped, and convolution operations can be performed at layer 211 between the groups of convolution outputs and another set of filter weights to generate another set of convolution outputs.

In some examples, the convolution operations can be performed between multiple images and multiple filters. For example, referring to FIG. 2C, a set of C filters 260 may corresponds to a number (C) of images 270, and convolution operations can be performed between each filter of the set of filters 260 and blocks of pixels on the corresponding image of images 270. Each of images 270 can corresponds to an input channel. The convolution results for each filter-image pair can be summed to generate a convolution output as follows:

$$O_{e,f} = \sum_{r=0}^{R-1} \sum_{s=0}^{S-1} \sum_{c=0}^{C-1} X^{c}_{eD+r,fD+s} \times W^{c}_{r,s} \quad \text{(Equation 2)}$$

Here, the convolution operation involves the images (or pixel arrays). $X^{c}_{eD+r,fD+s}$ may refer to the value of a pixel at an image of index c, within the number (C) of images 270, with a row coordinate of eD+r and a column coordinate of fD+s. For the rest of the disclosure, the coordinates of element $X^{c}_{eD+r,fD+s}$ can be represented in the form of (eD+r, fD+s). The index c can denote a particular input channel. D is the sliding-window stride distance, whereas e and f correspond to the location of the data element in the convolution output array, which can also correspond to a particular sliding window. Further, r and s correspond to a particular location within the sliding window. A pixel at an (r, s) location and of an image of index c can also correspond to a weight $W^{c}_{r,s}$ in a corresponding filter of the same index c at the same (r, s) location. Equation 2 indicates that to compute a convolution output $O_{e,f}$, each pixel within a sliding window (indexed by (e,f)) may be multiplied with a corresponding weight $W^{c}_{r,s}$. A partial sum of the multiplication products within each sliding window for each of the image within the image set can be computed. And then a sum of the partial sums for all images of the image set can be computed.

Moreover, in some examples, multiple sets of filters can be used to perform convolution operations with a set of images to generate a set of convolution output arrays, with each convolution output array corresponding to a set of filters. Each set of filters can correspond to an output channel. For example, the multiple sets of filters may correspond to multiple features to be detected from the set of images, and each convolution output array may correspond to the detection results for each feature from the set of images. For example, where M sets of filters are applied to C images to generate M convolution output arrays, Equation 2 can be updated as follows:

$$O_{e,f}^{m} = \sum_{r=0}^{R-1} \sum_{s=0}^{S-1} \sum_{c=0}^{C-1} X^{c}_{eD+r,fD+s} \times W^{c,m}_{r,s} \quad \text{(Equation 3)}$$

Here, convolution output $O_{e,f}^{m}$ and weight $W^{c,m}_{r,s}$ has an index m corresponding to one of the M sets of filters. The index m can denote a particular output channel.

Figure 2C:
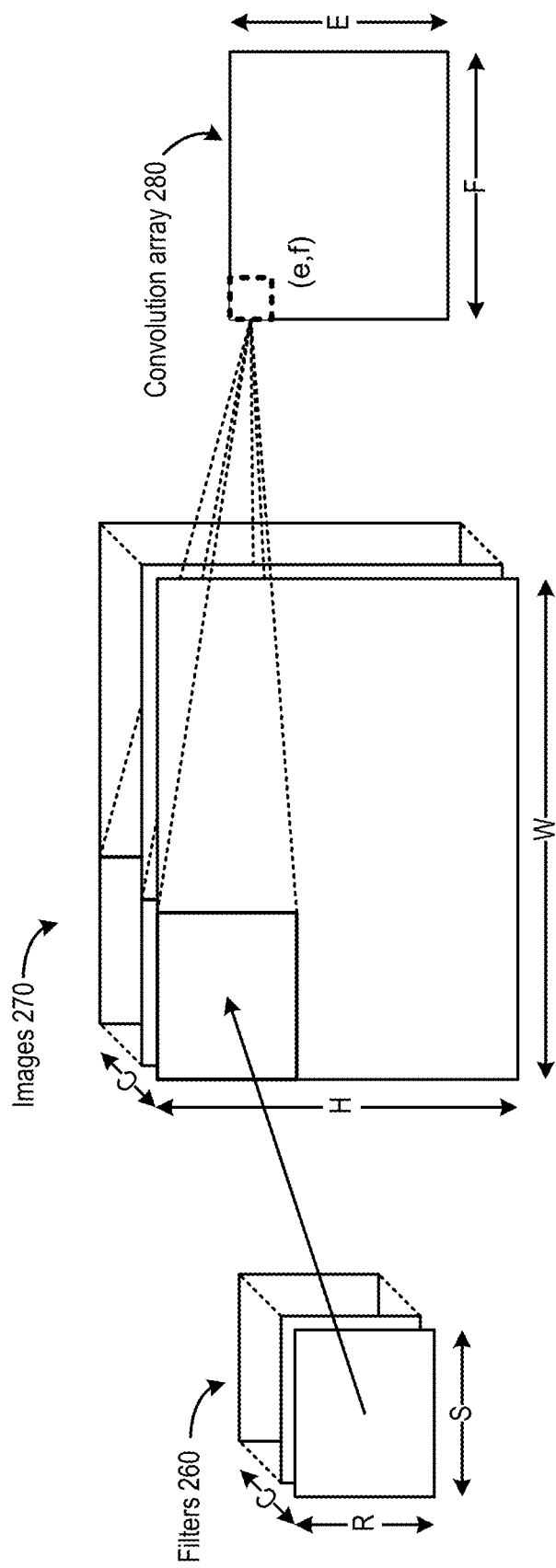
Figure 2D:
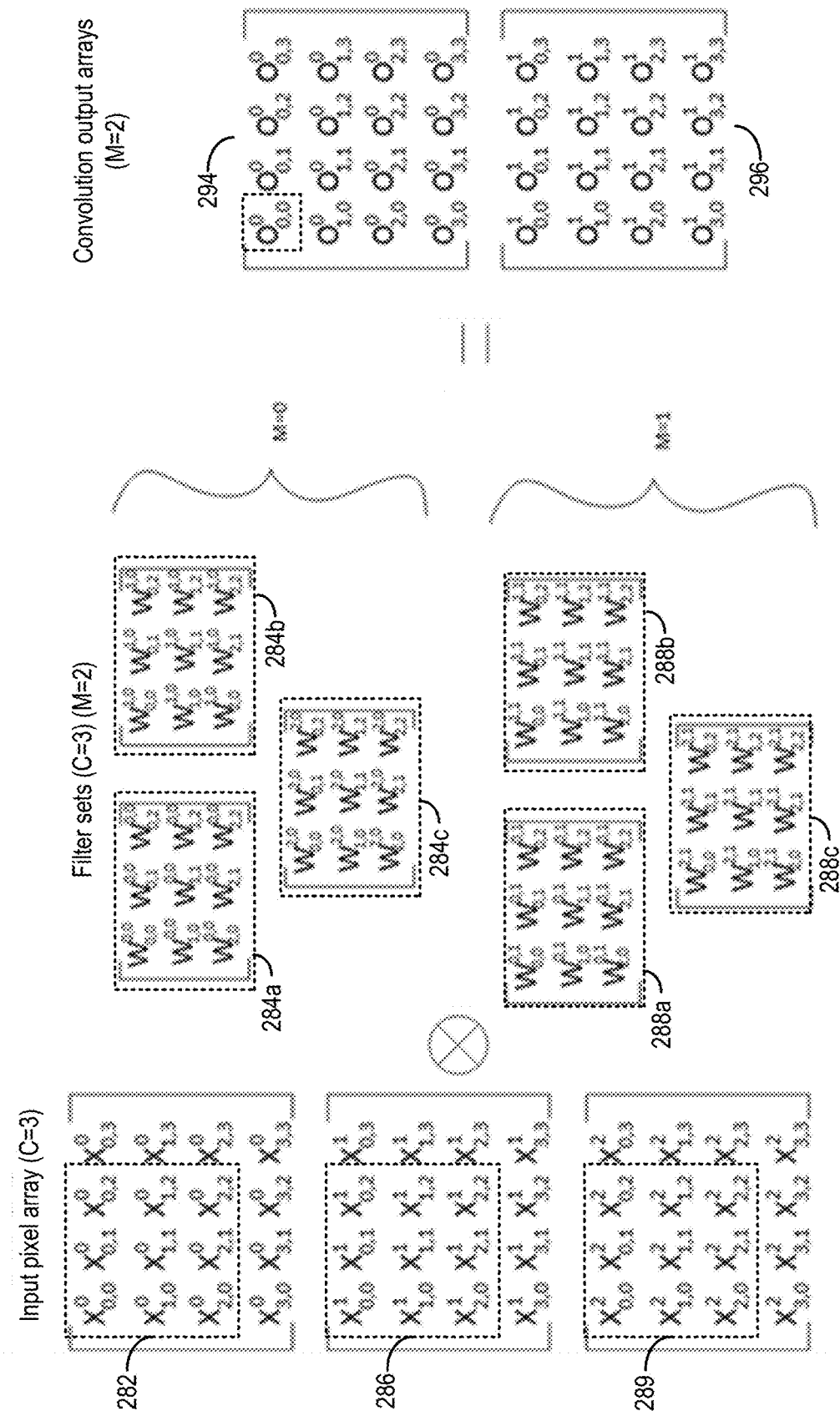

FIG. 2D illustrates an example of C sets of input data sets (with C=3) to be convolved with M sets of filters (with M=2). Each set of input data corresponds to the entries of a pixel array. Each of the M sets of filters includes a set of C filters which correspond to the C sets of input pixel arrays. The convolution operations generate M sets of output data elements, with each set of output data elements corresponding to a convolution output array. Each convolution output array corresponds to convolving one set (of the M sets) of filters with the input pixel arrays. For example, $O_{0,0}^{0}$ can be generated by a sum of the dot-product between group of pixels 282 and filter array 284, the dot-product between group of pixels 286 and filter array 288, and the dot-product between group of pixels 289 and filter array 292.

Referring back to FIG. 2A, one processing node of layer 209 may be configured to generate the convolution output elements of one convolution output array, and a set M of processing nodes of layer 209 can correspond to a set M of convolution output arrays. The processing node of layer 209 can also process each convolution output with an activation function to generate an activation output. The activation function may translate the convolution output into a decision of whether to forward the convolution output to intermediate layer 211 to influence the classifier decision (analogous to the firing of a biological neuron). An example of the activation function can be a rectified linear unit (ReLU) defined according to the following equation:

$$ReLU(x) = \begin{cases} x & \text{for } x \geq 0 \\ 0 & \text{for } x < 0 \end{cases} \quad \text{(Equation 4)}$$

In addition to ReLU, other forms of activation function can also be used including, for example, a softplus function (which can be a smooth approximation of a ReLU function), a hyperbolic tangent function (tan h), an arc tangent function (arctan), a sigmoid function, a Gaussian function, etc.

A processing node of layer 209 (e.g., processing node 210a) may process the sum with the ReLU function to generate a first output of layer 209 based on the following equation:

$$\text{first\_output}_{210a} = \text{ReLU}(\text{Sum}_{210a}) \quad \text{(Equation 5)}$$

Layer 211 may further process the scaled intermediate outputs from layer 209 by, for example performing additional convolution operations based on different sets of filters. The outputs from each processing node of layer 211 may be forwarded to other higher intermediate layers, or to an output layer (not shown in FIG. 2A). The output layer may form an output vector representing, for example, a probability that certain features are included in image 104, and/or a probability that image 204 includes an image of a panda. For example, the output vector may be compared against a reference vector associated with a nose object of a panda, or a reference vector associated with a panda. A decision about whether image 104 is an image of a panda can be determined based on the comparison result.

The convolution operations of FIG. 2B-FIG. 2D require performing a number of arithmetic operations (e.g., multiplication and addition operations) at each stride location to find the dot product. The convolution operations can be quite compute-intensive especially when involving a large image having lots of pixels, as a large number of strides may be needed to completely traverse the filter across the image.

Figure 2E:
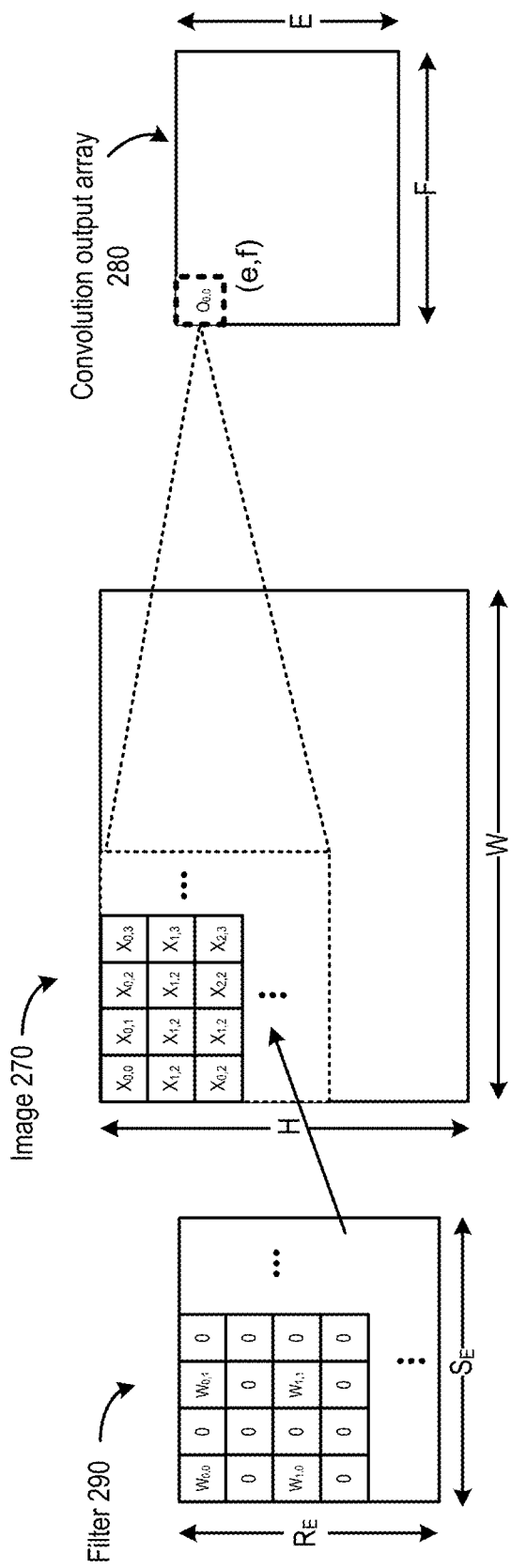

To reduce the computation cost for the convolution operation, a dilated convolution operation can be performed. FIG. 2E illustrates an example of a dilated convolution operation. As shown in FIG. 2E, a filter 290 can be generated from filter 290 by inserting a zero between elements of filter 260 of FIG. 2C. For example, a zero is inserted between weight elements $W_{0,0}$ and $W_{0,1}$ to expand the width the first row to $S_E$. Moreover, a zero is inserted between weight elements $W_{0,0}$ and $W_{1,0}$ to expand the height of the first column to $R_E$. The number of zeros inserted between the elements can be based on a rate of the dilated convolution. In the example of FIG. 2E, the rate of the dilated convolution is two. In a case where the rate of the dilated convolution is four, three zeros can be inserted between each the elements. A row of zeros is also inserted between the expanded rows to accommodate for the insertion of zero between weight elements $W_{0,0}$ and $W_{1,0}$, whereas a column of zeros is inserted between the expanded columns to accommodate for the insertion of zero between pixels $X_{0,0}$ and $X_{0,1}$.

As part of the dilated convolution operation, filter 290 can traverse image 270 at different stride locations, as in FIG. 2B. At each stride location, each element of filter 290 can multiply with the overlapping pixel of image 270 to generate a product, and the product can be summed to generate an output at convolution array 280. The stride location can determine the coordinates of the output in convolution array 280. As a result of enlarged footprint of filter 290, the number of pixels overlapping with filter 290 increases, but every other pixel overlaps with a zero and is not represented in the sum. For example, in the stride location shown in FIG. 2E, weight element $W_{0,0}$ can multiply with pixel $X_{0,0}$ of image 270, whereas weight element $W_{0,1}$ can multiply with pixel $X_{0,2}$ of image 270, with $X_{0,1}$ skipped. Because of the larger footprint of filter 290, the number of strides needed to complete traversal of filter 290 over image 270 can be reduced. If the hardware accelerator also includes hardware to bypass multiplications and additions involving zeros, the number of arithmetic operations at each stride can be the same or similar to the normal convolution of FIG. 2C involving filter 260. With the number of strides reduced, the total number of arithmetic operations involved in the dilated convolution operation can be reduced.

Figure 3:
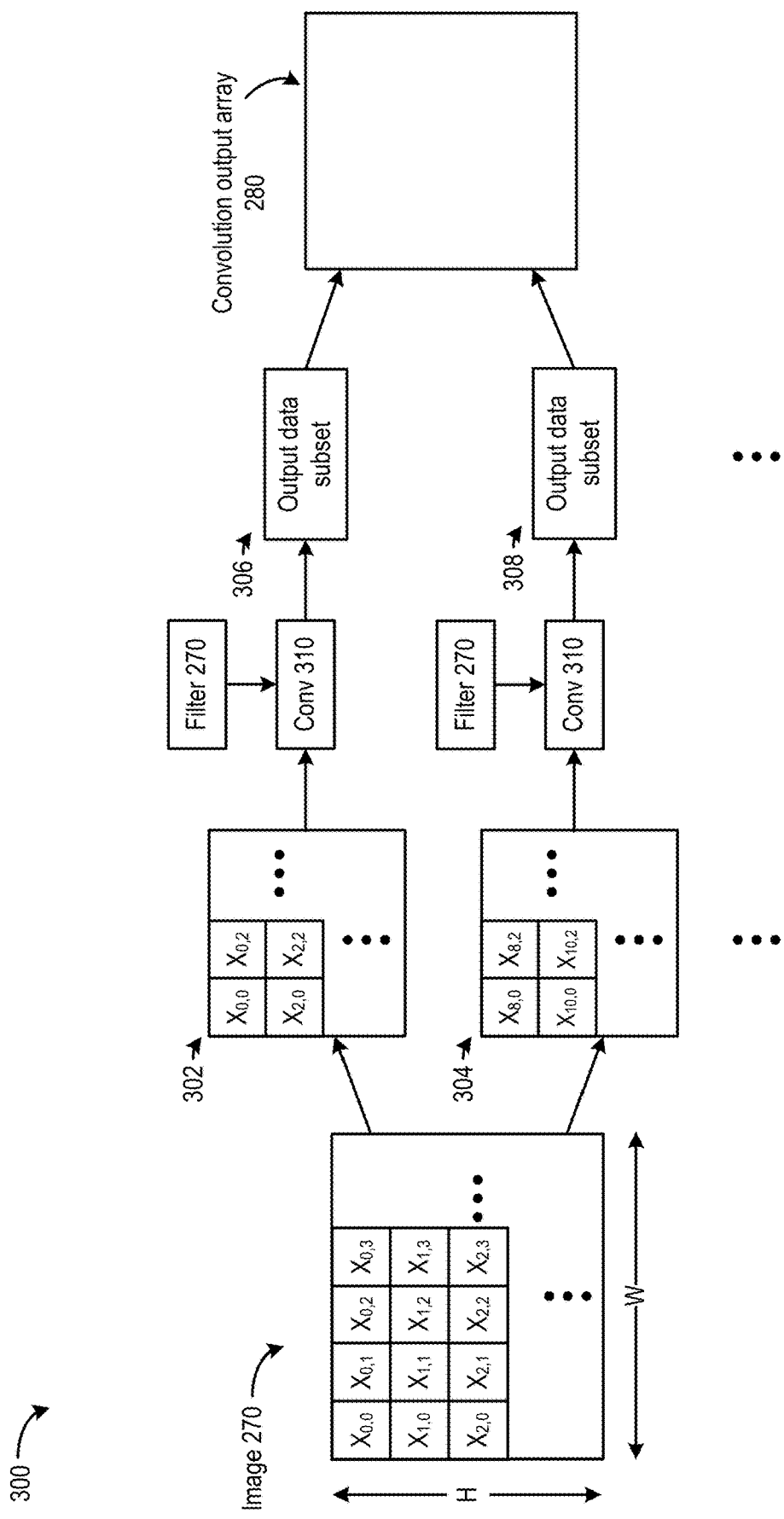
FIG. 3 illustrates an example implementation of dilated convolution.

FIG. 3 illustrates an example sequence 300 of implementing a dilated convolution operation in a computing environment. In the example of FIG. 3, a dilated convolution operation of a rate of two and a stride of two can be performed between image 270 and filter 290, with filter 290 generated from filter 260 by inserting a zero between adjacent weight elements as described above. To perform the dilated convolution operation, the pixel data of image 270 can be split into subsets of pixel data that overlap with the non-zero weight elements of filter 290 at each stride location. As shown in FIG. 3, the pixel data of image 270 can be split into an input data subset 302, an input data subset 304, etc. Each of input data subsets 302 and 304 includes pixels that overlap with filter 290 at multiple stride locations. A convolution operation 310 can be performed between the original filter 290 (which is expanded to filter 290 for the dilated convolution operation) and each subset of pixels to generate a subset of the output elements, including output data subsets 306 and 308, of convolution array 280. The output elements of output data subsets 306 and 308 can be interleaved and/or rearranged according to stride locations represented by the input data subsets to assemble convolution array 280.

Sequence 300 may involve a large number of memory read and write operations. For example, the splitting of the pixels of image 270 into subsets of pixels can be performed by reading pixels of image 270 from a memory location and storing the subsets of pixels at other memory locations. Moreover, the output data subsets 306 and 308 can be stored in the memory after they are generated from convolution operations 310, and the output data subsets can be read from the memory and stored back into the memory as part of the interleaving/rearrangement operation to assemble convolution array 280. All these additional memory read and write operations can add latency and increase the time needed to complete the dilated convolution operation in the computing environment.

Figure 4A:
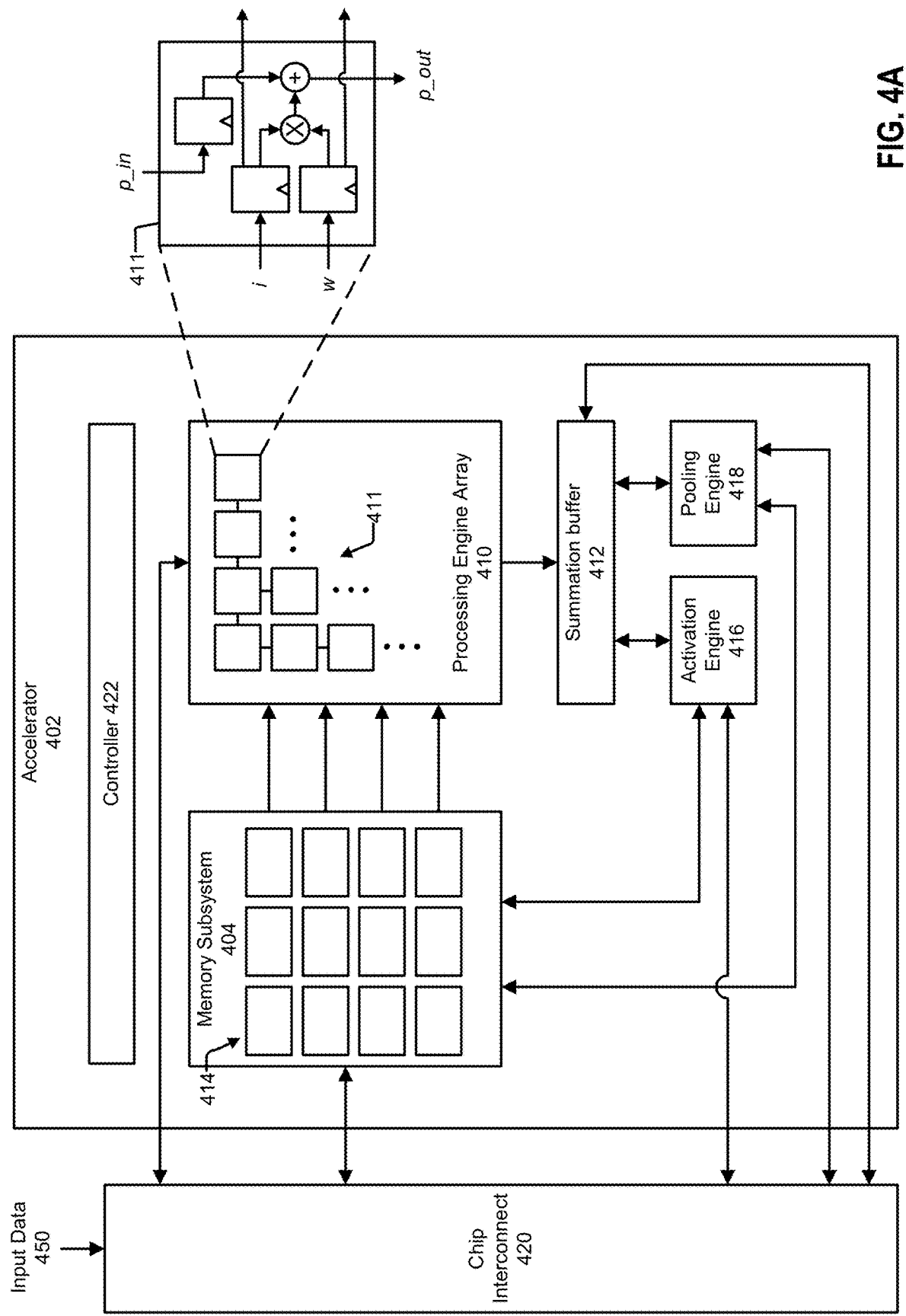
FIGS. 4A-4C illustrate an example neural network processor and its operations, according to certain aspects of the present disclosure.

FIG. 4A is a block diagram illustrating an example of an integrated circuit device that can be configured to perform various types of convolution operations, including normal convolution and dilated convolution operations. The example of FIG. 4 illustrates an accelerator 402. In various examples, the accelerator 402, for a set of input data (e.g., input data 450), can execute computations using a processing engine array 410, an activation engine 416, and/or a pooling engine 418. In some examples, the example accelerator 402 may be an integrated circuit component of a processor, such as a neural network processor. The processor may have other integrated circuit components, including additional accelerator engines. Accelerator 402 may include a controller 422 to control the operations of processing engine array 410, activation engine 416, and/or pooling engine 418.

In various implementations, the memory subsystem 404 can include multiple memory banks 414. In these implementations, each memory bank 414 can be independently accessible, meaning that the read of one memory bank is not dependent on the read of another memory bank. Similarly, writing to one memory bank does not affect or limit writing to a different memory bank. In some cases, each memory bank can be read and written at the same time. Various techniques can be used to have independently accessible memory banks 414. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 404 can permit simultaneous access to the read or write channels of multiple memory banks. As another example, the memory subsystem 404 can include arbitration logic such that arbitration between, for example, the outputs of multiple memory banks 414 can result in more than one memory bank's output being used. In these and other examples, though globally managed by the memory subsystem 404, each memory bank can be operated independently of any other.

Having the memory banks 414 be independently accessible can increase the efficiency of the accelerator 402. For example, values can be simultaneously read and provided to each row of the processing engine array 410, so that the entire processing engine array 410 can be in use in one clock cycle. As another example, the memory banks 414 can be read at the same time that results computed by the processing engine array 410 are written to the memory subsystem 404. In contrast, a single memory may be able to service only one read or write at a time. With a single memory, multiple clock cycles can be required, for example, to read input data for each row of the processing engine array 410 before the processing engine array 410 can be started.

In various implementations, the memory subsystem 404 can be configured to simultaneously service multiple clients, including the processing engine array 410, the activation engine 416, the pooling engine 418, and any external clients that access the memory subsystem 404 over a communication fabric 420. In some implementations, being able to service multiple clients can mean that the memory subsystem 404 has at least as many memory banks as there are clients. In some cases, each row of the processing engine array 410 can count as a separate client. In some cases, each column of the processing engine array 410 can output a result, such that each column can count as a separate write client. In some cases, output from the processing engine array 410 can be written into the memory banks 414 that can then subsequently provide input data for the processing engine array 410. As another example, the activation engine 416 and the pooling engine 418 can include multiple execution channels, each of which can be separate memory clients. The memory banks 414 can be implemented, for example, using static random access memory (SRAM).

In various implementations, the memory subsystem 404 can include control logic. The control logic can, for example, keep track of the address spaces of each of the memory banks 414, identify memory banks 414 to read from or write to, and/or move data between the memory banks 414. In some implementations, memory banks 414 can be hardwired to particular clients. For example, a set of memory banks 414 can be hardwired to provide values to the rows of the processing engine array 410, with one memory bank servicing each row. As another example, a set of memory banks can be hard wired to receive values from columns of the processing engine array 410, with one memory bank receiving data for each column.

The processing engine array 410 is the computation matrix of the example accelerator 402. The processing engine array 410 can, for example, execute parallel integration, convolution, correlation, and/or matrix multiplication, among other things. The processing engine array 410 includes multiple processing engines 411, arranged in rows and columns, such that results output by one processing engine 411 can be input directly into another processing engine 411. Processing engines 411 that are not on the outside edges of the processing engine array 410 thus can receive data to operate on from other processing engines 411, rather than from the memory subsystem 404.

In various examples, the processing engine array 410 uses systolic execution, in which data arrives at each processing engine 411 from different directions at regular intervals. In some examples, input data can flow into the processing engine array 410 from the left and weight values can be loaded at the top. In some examples weights and input data can flow from the left and partial sums can flow from top to bottom. In these and other examples, a multiply-and-accumulate operation moves through the processing engine array 410 as a diagonal wave front, with data moving to the right and down across the array. Control signals can be input at the left at the same time as weights, and can flow across and down along with the computation.

In various implementations, the number of columns in the processing engine array 410 determines the computational capacity of the processing engine array 410, and the number of rows determines the required memory bandwidth for achieving maximum utilization of the processing engine array 410. The processing engine array 410 can have, for example, 64 columns and 428 rows, or some other number of columns and rows.

An example of a processing engine 411 is illustrated in FIG. 4 in an inset diagram. As illustrated by this example, a processing engine 411 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing engine 411.

In the illustrated example, an input from above can include a partial sum, p_in, provided either from another processing engine 411 or from a previous round of computation by the processing engine array 410. When starting a computation for a new set of input data, the top row of the processing engine array 410 can receive a fixed value for p_in, such as zero. As illustrated by this example, i and w are multiplied together and the result is summed with p_in to produce a new partial sum, p_out, which can be input into another processing engine 411. Various other implementations of the processing engine 411 are possible. Outputs from the last row in the processing engine array 410 can be temporarily stored in the results buffer 412. The results can be intermediate results, which can be written to the memory banks 414 to be provided to the processing engine array 410 for additional computation. Alternatively, the results can be final results, which, once written to the memory banks 414 can be read from the memory subsystem 404 over the communication fabric 420, to be output by the system.

In some implementations, the accelerator 402 includes an activation engine 416. In these implementations, the activation engine 416 can combine the results from the processing engine array 410 into one or more output activations. For example, for a convolutional neural network, convolutions from multiple channels can be summed to produce an output activation for a single channel. In other examples, accumulating results from one or more columns in the processing engine array 410 may be needed to produce an output activation for a single node in the neural network. In some examples, activation engine 416 can be bypassed.

In various examples, the activation engine 416 can include multiple separate execution channels. In these examples, the execution channels can correspond to the columns of the processing engine array 410, and can perform an operation on the outputs of a column, the result of which can be stored in the memory subsystem 404. In these examples, the activation engine 416 may be able to perform between 1 and n parallel computations, where n is equal to the number of columns in the processing engine array 410. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, the accelerator 402 can include a pooling engine 418. Pooling is the combining of outputs of the columns of the processing engine array 410. Combining can include for example, computing a maximum value, a minimum value, an average value, a median value, a summation, a multiplication, or another logical or mathematical combination. In various examples, the pooling engine 418 can include multiple execution channels that can operating on values from corresponding columns of the processing engine array 410. In these examples, the pooling engine 418 may be able to perform between 1 and n parallel computations, where n is equal to the number of columns in the processing engine array 410. In various examples, execution channels of the pooling engine 418 can operate in parallel and/or simultaneously. In some examples, the pooling engine 418 can be bypassed.

Herein, the activation engine 416 and the pooling engine 418 may be referred to collectively as execution engines. The processing engine array 410 is another example of an execution engine. Another example of an execution engine is a Direct Memory Access (DMA) engine, which may be located outside the accelerator 402.

Input data 450 can arrive over the communication fabric 420. The communication fabric 420 can connect the accelerator 402 to other components of a processor, such as a DMA engine that can obtain input data 450 from an Input/Output (I/O) device, a storage drive, or a network interface. The input data 450 can be, for example one-dimensional data, such as a character string or numerical sequence, or two-dimensional data, such as an array of pixel values for an image or frequency and amplitude values over time for an audio signal. In some examples, the input data 450 can be three-dimensional, as may be the case with, for example, the situational information used by a self-driving car or virtual reality data. In some implementations, the memory subsystem 404 can include a separate buffer for the input data 450. In some implementations, the input data 450 can be stored in the memory banks 414 when the accelerator 402 receives the input data 450.

In some examples, the accelerator 402 can implement a neural network processing engine. In these examples, accelerator 402, for a set of input data 450, can execute a neural network to perform a task for which the neural network was trained. Executing a neural network on a set of input data can be referred to as inference or performing inference.

The weights for the neural network can be stored in the memory subsystem 404, along with input data 450 on which the neural network will operate. The addresses of the weights and input data 450 in memory subsystem 404 can be based on or mapped to the coordinates of the weights and input data 450 in, respectively, a weight data array and an input data array, which allows the weight and the input data to be retrieved based on addresses derived from their coordinates. The neural network can also include instructions, which can be executed by controller 422 to control the processing engine array 410 to perform various computations on the weights and the input data. The instructions can be generated by a compiler and can also be stored in the memory subsystem 404, in the memory banks 414 or in a separate instruction buffer. The processing engine array 410 can output intermediate results, which represent the outputs of individual layers of the neural network. In some cases, the activation engine 416 and/or pooling engine 418 may be enabled for computations called for by certain layers of the neural network. The accelerator 402 can store the intermediate results in the memory subsystem 404 for inputting into the processing engine array 410 to compute results for the next layer of the neural network. The processing engine array 410 can further output final results from a last layer of the neural network. The final results can be stored in the memory subsystem 404 and then be copied out to host processor memory or to another location.

Figure 4B:
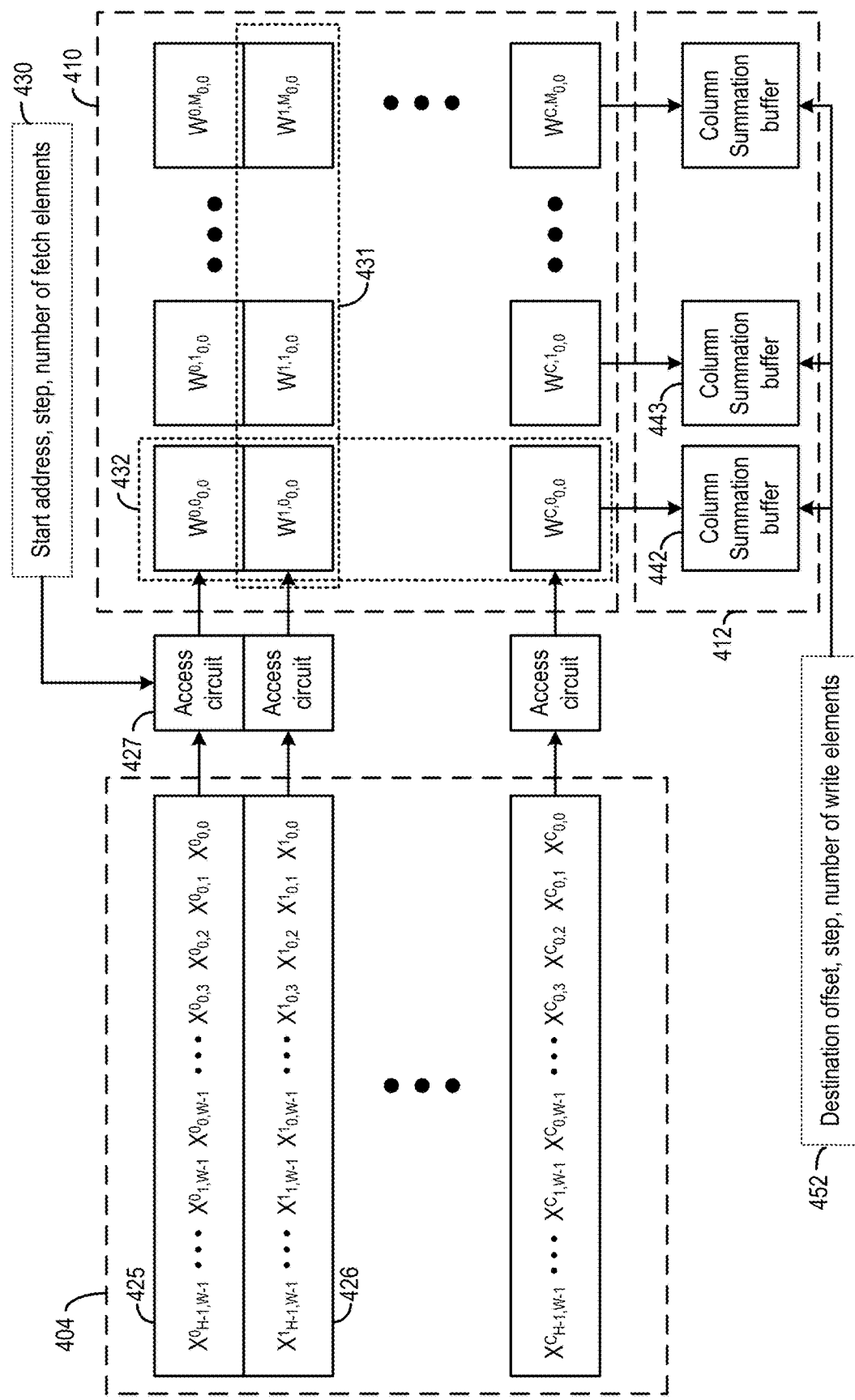
Figure 4C:
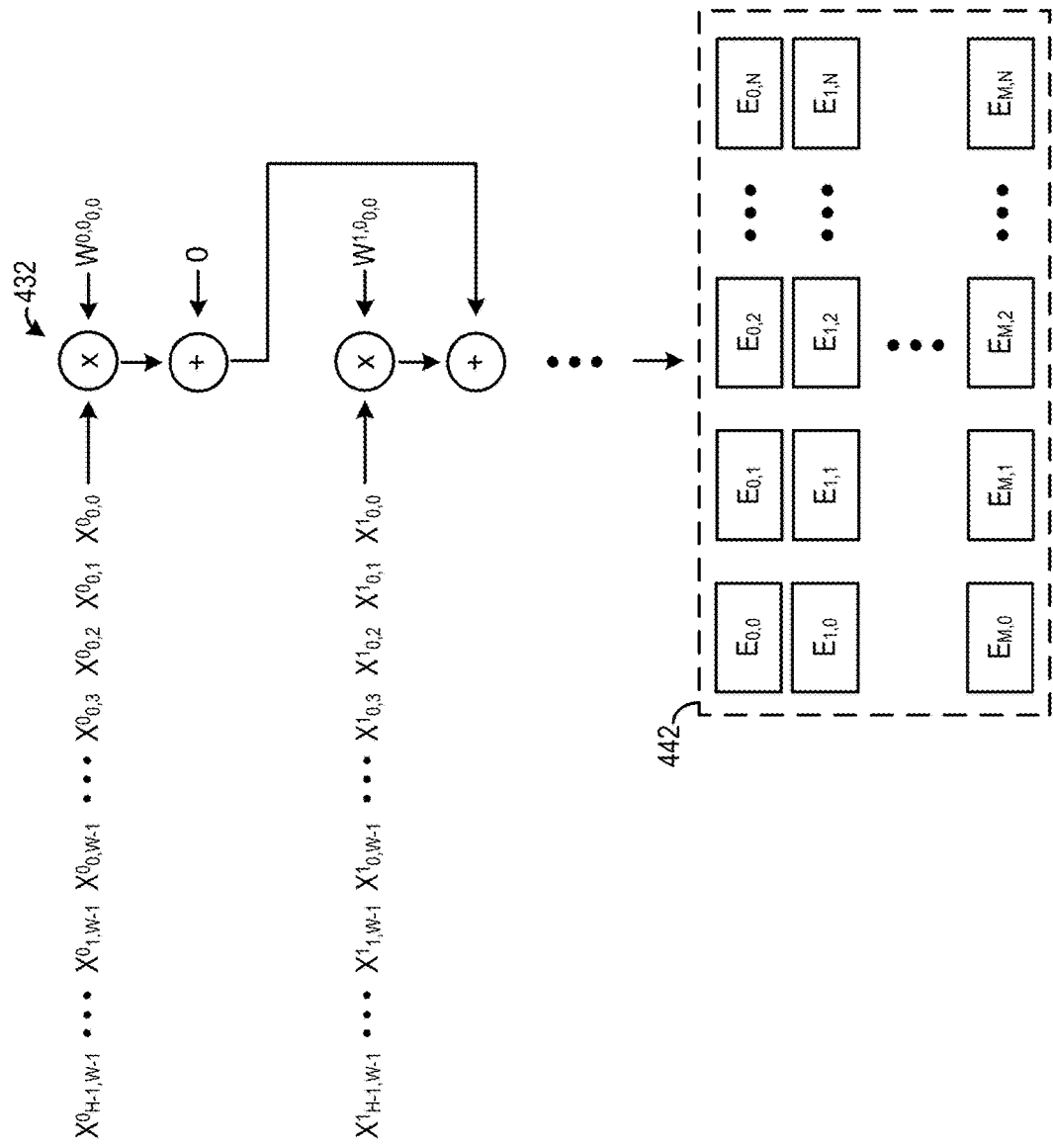

FIG. 4B and FIG. 4C illustrate examples of operations of accelerator 402. As shown in FIG. 4B, memory subsystem 404 can be organized into multiple rows, such as memory rows 425, 426, etc. Each memory row can store the input data elements of a particular input channel. A memory access circuit (e.g., memory access circuit 427) can be controlled to fetch the input data elements to processing engine array 410 sequentially based on a set of memory fetch parameters 430 including a start address, step, and number of elements. The start address parameter can define the location of the first input data element to be read from the memory row, the step parameter can define a number of input data elements skipped between the fetched input data elements, whereas the number of fetch elements parameter can define a total number of input data elements to fetched. As the input data elements are stored in a contiguous space, access circuit 427 can determine the addresses of the input data elements to be fetched and update the counter based on the step. For example, access circuit 427 can start fetching the first input data element from the start address, add an address offset based on the step to the start address to fetch the next input data element while skipping a number of input data elements, and repeat until the number of fetch elements is reached. As to be described in more details below, memory fetch parameters 430 can be included in an instruction to compute a set of partial sums. The instruction can be generated by a compiler and parsed by controller 422 to extract memory fetch parameters 430. Controller 422 can then control the fetching of input data elements from memory subsystem 400 based on the extracted memory fetch parameters 430. As to be described in details below, the start address, step, and number of elements parameters can be configured to support different types of convolution operations, such as a normal convolution operation, a dilated convolution operation, etc.

The processing engines 411 of processing engine array 410 can be organized into rows, such as row 431, and columns, such as column 432. Each row of processing engines 411 is mapped to an input channel and can receive input data elements sequentially from a memory row of memory system 404 mapped to the input channel, whereas each column of processing engines 411 can be mapped to an output channel. Input data elements are stored in a contiguous address space and following an order based on their coordinates in the input data array. Each processing engine 411 can store a weight data element for an input channel and an output channel the processing engine is mapped to. Each column of processing engines 411. Referring to FIG. 4A and FIG. 4B, a processing engine 411 within an engine can receive input data elements of an input channel (e.g., input data i of FIG. 4A), multiply it with the stored weight (e.g., weight data w of FIG. 4A) to generate a product, add the product to the input partial sum p_in to generate the new partial sum p_out, and pass the new partial sum p_out to the processing engine 411 below of the same column. The bottom processing engine 411 of a column can generate a partial sum representing a sum of products between the weight data elements stored in the column of processing engines 411 and the input data elements of different input channels received from memory substation 404.

In a case where memory fetch parameters 430 indicate that the starting address is at the rightmost input data element of each row, a step of one (which can indicate skipping in this example), and a certain number of input data elements are to be fetched, in a first iteration column 432 of processing engines 411 can generate a first partial sum based on the stored weight data elements and input data elements provided by memory subsystem 404 as follows:

$$\text{First partial sum} = X^0_{0,0} \times W^{0,0}_{0,0} + X^0_{0,0} \times W^{1,0}_{0,0} + \ldots + X^C_{0,0} \times W^{C,O}_{0,0} \quad \text{(Equation 6)}$$

In a second iteration, column 432 of processing engines 411 can generate a second partial sum based on the stored weight data elements and input data elements provided by memory subsystem 404 as follows:

$$\text{Second partial sum} = X^0_{0,1} \times W^{0,0}_{0,0} + X^0_{0,1} \times W^{1,0}_{0,0} + \ldots + X^C_{0,1} \times W^{C,O}_{0,0} \quad \text{(Equation 7)}$$

Each column of processing engines 411 can provide the partial sums generated in the iterations to a column summation buffer, such as column summation buffers 442, 443, etc., both of which are part of summation buffer 412. The partial sums are generated based on weight data elements at the same coordinates of different filter arrays associated with different input and output channels, and the partial sums correspond to different output data elements. Referring to FIG. 4C, each of column summation buffers 442 and 443 includes a number of entries, such as $E_{0,0}$, $E_{0,1}$, $E_{0,2}$, etc. Each entry can have coordinates mapped to coordinates of an output tile, which can represent a region of an output array. Each entry has an adder (not shown in FIG. 4C) which allows the entry to add a received partial sum to the stored partial sum to generate an accumulated partial sum. The entry can then store the accumulated partial sum.

The operations at column summation buffers 442 and 443 can be controlled by a set of buffer write parameters 452 including a destination offset, a step, and a number of write elements. The destination offset parameter can indicate the entry to which the first partial sum (of the first iteration) is to be added to. The step parameter can indicate a number of entries to be skipped between neighboring entries that receive partial sums. The step parameter can correspond to a gap between non-zero input data elements that overlap with a weight data element when the weight data array is at different stride locations. Moreover, the number of write elements indicate a number of partial sums to be added to entries of the summation buffer starting from the start address, with neighboring entries separated based on the step parameter as described above.

As an illustrative example, in a case where the destination offset is 2 and the step is 1, the first partial sum from column 432 can be stored at entry $E_{0,2}$, the second partial sum can be stored at $E_{0,3}$, the third partial sum can be stored at $E_{0,4}$, etc., until a number of partial sums specified by the number of write elements is stored. As to be described in more details below, buffer write parameters 452 can be included in the instruction to compute the set of partial sums. The instruction can be parsed by controller 422 to extract buffer write parameters 452. Controller 422 can then control the operations of the summation buffers based on the extracted buffer write parameters 452. As to be described below, buffer write parameters 452 can be configured to support convolution operations.

After computing the partial sums from a first set of weight data elements (same coordinates in their respective filter arrays but of different input and output channels), processing engine array 410 can load a new set of weight data elements from different coordinates and repeat the partial sums computations. The new partial sums can be added to the partial sums stored in summation buffer 412 computed from the first set of weight data elements. The computations and accumulations of the partial sums can continue for the rest of the weight data elements to generate the data elements of the output tile. After the data elements of the output tile are generated, summation buffer 412 can provide the data elements of the output tile to activation engine 416 and/or pooling engine 418 for post-processing, and the post-processed output data elements can be stored in memory subsystem 404. From memory subsystem 404, the post-processed output data can be sent to chip interconnect 420 and/or fetched to processing engine array 410 as input data for a subsequent neural network layer processing.

Figure 5A:
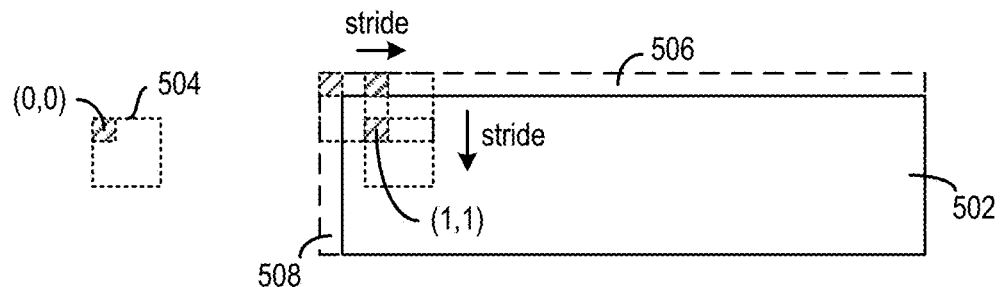
Figure 5A:
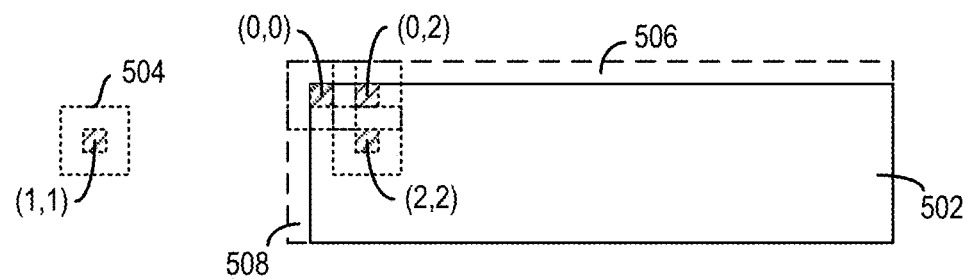
Figure 5A:
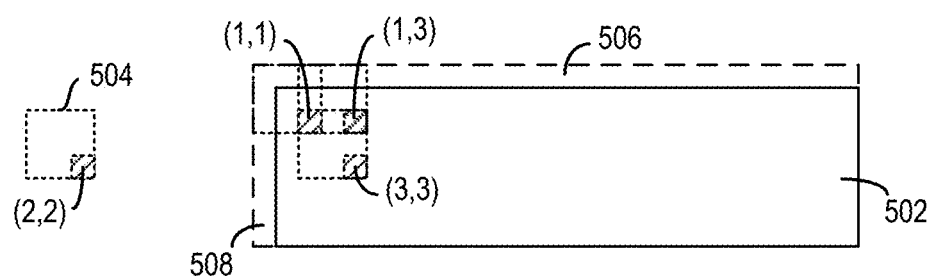

FIG. 5A-FIG. 5D illustrate example configurations of accelerator 402 to perform a normal convolution operation. FIG. 5A illustrates the overlapping between different weight data elements of a 3×3 filter array 504 and the input data elements of an input data array 502. In FIG. 5A, input data array 502 can be padded with a row 506 of zeros on the top and a column 508 of zeros on the left. The number of rows of padding zero can be specified by a pad_north parameter, with pad_north equals one indicating that one row of zeros is padded on the top of input data array 502. Moreover, the number of columns of padding zero can be specified by a pad_west parameter, with pad_west equals one indicating that one column of zeros is padded on the left of input data array 502. The normal convolution operation can be between the zero-padded input data array 502 and filter array 504, with a stride of 2. Some of input data elements/padding zeros that overlap with a particular weight data element at different stride locations are shaded. As shown in FIG. 5A, some of the padding zeros, as well as input data element at coordinates (1, 1), can overlap with the weight data element (0, 0) at different stride locations. Moreover, input data elements (0, 0), (0, 2), and (2, 2) can overlap with weight data element (1, 1) at different stride locations. Further, input data elements (1, 1), (1, 3), and (3, 3) can overlap with weight data element (2, 2) at different stride locations. In each cases, there is a gap between each input data elements that overlap with the weight data element. The gap can be defined based on the stride distance of the convolution operation. With a stride distance of two, the gap comprises one input data element.

Referring back to FIG. 4B and FIG. 4C, to perform the normal convolution operation of FIG. 5A, controller 422 can be provided with memory fetch parameters 430 which defines a set of overlapping non-zero input data elements for a weight data element that is loaded into a processing engine 411. The set of overlapping non-zero input data elements can be defined based on start address, step, as well as number of fetch elements parameters. The start address can be the address of the first overlapping non-zero input data elements in memory subsystem 404. The address can be determined based on a mapping between memory subsystem 404 addresses and the coordinates of the input data elements stored in memory subsystem 404. Moreover, the step can correspond the gap described above and can be based on the stride distance. Further, the number of fetch elements can be based on the dimensions of the output tile for the convolution operation, which in turn can be based on the dimensions of the summation buffer, as to be described below. Based on memory fetch parameters 430 for each weight data element, controller 422 can fetch the correct subset of input data elements to processing engine array 410 to multiply with that weight data element to generate partial sums.

Moreover, controller 422 can be provided with buffer write parameters 452 to store non-zero partial sums for different stride locations at entries of a column summation buffer (e.g., column summation buffer 442) corresponding to the stride locations. For example, referring back to FIG. 4C, the partial sum for a stride location (0, 0) can be accumulated at entry $E_{0,0}$, the partial sum for a stride location (0, 1) can be accumulated at entry $E_{0,1}$, etc. The destination offset of buffer write parameters 452 can also be based on the set of overlapping non-zero input data elements for a weight data element. Specifically, the starting offset can be provided to the column summation buffer to skip a number of entries corresponding to zero partial sums, which corresponds to a number of padding zeros that overlap with the weight data element, until the entry that corresponds to the stride location where the weight data element overlaps with an input data element. Referring to the example of FIG. 5A, weight data element (0, 0) overlaps with the padding zeros at the first few stride locations until overlapping with input data element at (1, 1). The destination offset of buffer write parameters 452 can be configured to ensure that the partial sum generated from input data element at (1, 1) is stored at an entry that reflects the stride location of filter array 504 when weight data element (0, 0) overlaps with input data element (1, 1).

Figure 5B:
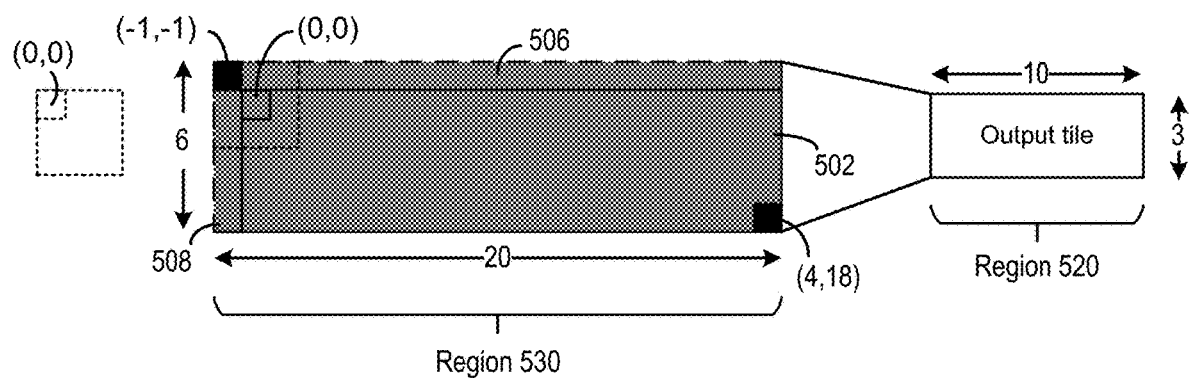
Figure 5B:
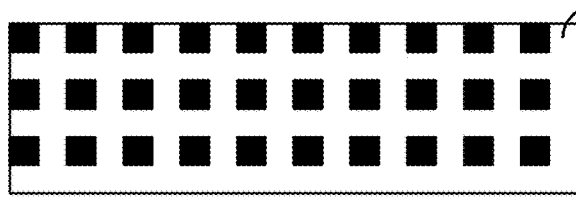
Figure 5B:
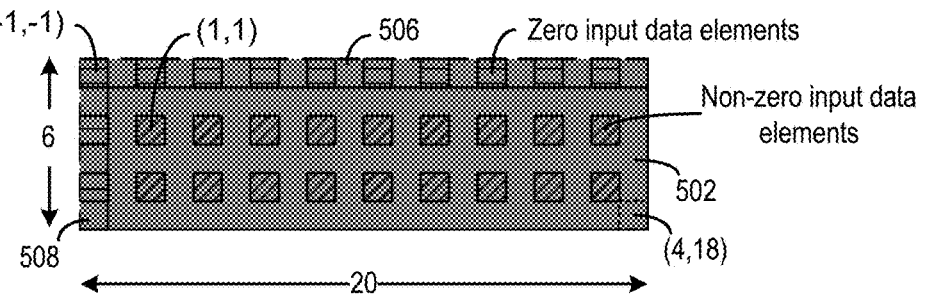

FIG. 5B illustrates example operations to determine the overlapping input data elements for a particular weight data element, which can be performed by a compiler. Referring to FIG. 5B, based on the dimensions of a column summation buffer (e.g., number of rows and columns of entries), the compiler can determine the dimension of an output tile as well as the total number of entries of the column summation buffer. As described above, the output tile comprises output data elements of a region 520 in the output data array, and the output tile can be defined by a range of coordinates of the first region in the output data array.

In operation 522, the compiler can perform a projection operation from region 520 represented by the output tile to determine a region 530 in input data array 502 that can provide the input data elements to be convolved with a weight data element to generate the output tile. The projection operation can take into account the dimensions of the first region as well as the stride distance of the convolution operation. As described above, the stride distance can define the gap between each overlapping input data elements, with a stride distance of two leading a gap of an input data element. The dimension of region 530 can be determined based on the dimension of region 520 and the gap. For example, referring to FIG. 5B, based on the output tile having 10 output data elements per row and three rows (a total 30 entries), the dimensions of region 530 can be determined by scaling the dimension of region 520 by two, such that region 520 has 20 input data elements per row and six rows. With such arrangement, as one input data element is skipped between two input data elements, the total number of input data elements (and the resulting partial sums) can be equal to the total number of output data elements in the output tile, as well as the number of entries of the column summation buffer.

After determining the dimensions of region 520, the compiler can align region 530 with the padded input data array 502. The alignment can be based on the coordinates of the weight data element as well as the pad_north and pad_west parameters. The coordinates of the upper-left corner of region 530, with respect to the original input data array 502, can be based on the follow equations:

$$\text{Start\_coordinates} = (\text{weight\_r} - \text{pad\_west}, \text{weight\_s} - \text{pad\_north}) \quad \text{(Equation 8)}$$

In Equation 8, start_coordinates refer to the coordinates of the upper-left corner of region 530, weight_r refers to the row coordinates of the weight data element, weight_s refers to the column coordinates of the weight data element, pad_west refers to the number of columns of zeros added to the left of input data array 502, whereas pad_north refers to the number of rows of zeros added to the top of input data array 502.

As shown in FIG. 5A, for weight data element (0, 0), the upper-left corner of region 530 can align with the upper-left corner of zero-padded input data array 502. With such alignment, weight data element (0, 0), with filter array 504 at stride location (0, 0), overlaps the upper-leftmost element of region 530, which represents the first input data element to be multiplied with the weight data element and is at coordinates (−1, −1) with respect to the original input data array 502. From the alignment operation, the compiler can determine a range of target coordinates of region 520 with respect to the original input data array 502. In FIG. 5B, the range of target coordinates of region 530 can be from (−1, −1) and (4, 18) with respect to the upper-left corner of the original input data array 502, which has the coordinates (0, 0). The location of the upper-leftmost element of region 530 can be a reference location and can be based on the location of the output tile in the output data array. For example, for a second output tile immediately below region 520, the reference location can be offset from (−1, −1) by the height of region 530 and can be at (5, −1).

In operation 540, after determining the target coordinates of region 530, the compiler can superimpose a stride pattern 550 over region 530. Stride pattern 550 can define the gap between overlapping input data elements based on the stride distance. Each dark box in stride pattern 550 can represent an overlapping input data element. As described above, with a stride distance of two, the gap includes an input data element. When superimposing stride pattern 550 over region 530, the upper-left corner of stride pattern 550 aligns with the upper-left corner of region 530. Based on the alignment and the gap in stride pattern 550, the compiler can compute the coordinates of stride pattern 550 with respect to the original input data array 502 based on the coordinates of the upper-leftmost element of region 530 (−1, −1), as well as the gap information. For example, a first element of the stride pattern overlaps with the upper-leftmost element of region 530 and has coordinates (−1, −1), a second element of the stride pattern on the same row as the first element has a gap of 1 from the first element and can have coordinates (−1, 1), etc. Based on the coordinates of the stride pattern, as well as dimensions of the original input data array 502 which can define a range of coordinates of the input data elements included in the original input data array 502, the compiler can identify a first subset of the coordinates that are within the zero-padding region and a second subset of the coordinates that are within original input data array 502. The first subset of the coordinates are in the zero-padding region and can represent zero input data elements that lead to zero partial sums (since multiplication of zero), whereas the second subset of the coordinates can represent non-zero input data elements that lead to non-zero partial sums. The non-zero input data elements represented by the second subset of the coordinates can be the overlapping input data elements with the weight data element (0, 0) in the original input data array 502.

The compiler can determine start address, step, number of fetch elements parameters of memory fetch parameters 430 based on the first subset of the coordinates in the zero-padding region and the second subset of the coordinates in the original input data array 502. Specifically, the start address parameter of memory fetch parameters 430 can correspond to the first coordinates in the second subset of coordinates. In the example of FIG. 5B, the start address can correspond to coordinates (1, 1) of the input data array 502, which can be translated to an address in memory subsystem 404. Moreover, the step is based on the stride distance as described above. The number of fetch elements parameter can be based on the size of the second subset of the coordinates. In the example of FIG. 5B, the size of the second subset of the coordinates can be 18, since there are 18 non-zero input data elements in the original input data array 502 that can overlap with weight data element (0, 0). Therefore, the number of fetch elements parameter can be set to 18 as well.

The compiler can also determine the destination offset, step, and number of write elements parameters of buffer write parameters 452 based on the first subset of the coordinates in the zero-padding region and the second subset of the coordinates in the original input data array 502. Specifically, based on the first subset of the coordinates, the compiler can determine that the first 11 input data elements are zero, which means the first 11 entries of the column summation buffer needs to be skipped, and the destination offset parameter can be set to 11. Moreover, as 18 input data elements are to be fetched, 18 partial sums will be generated, and the number of write elements parameter can be set to 18. Moreover, the non-zero input data elements that overlap with the weight data element are separated by the stride, which means there is no gap between the overlapping non-zero input data elements when the weight data array is at various stride locations in the input data array. Therefore the step parameter of buffer write parameters 452 can be set to one. To maintain a rectangular shape, the 18 partial sums can be stored in a 9×2 region (which can based on a number of input data elements in a row) in the column summation buffer shifted to the right with the first column of entries skipped.

Referring back to operation 522 and Equation 8, the compiler can adjust the alignment of region 530 with respect to the padded input data array 502 based on the coordinates of the weight data element by adding an offset along both the row and column dimension. For example, referring to FIG. 5C, for weight data element (1, 1), the compiler can compute the coordinates of the upper-left corner of region 530 using Equation 8 and obtain (0, 0). That is, compared with weight data element (0, 0), region 530 is shifted towards right and bottom by one unit from the upper-left corner of the padded input data array 502 and with respect to reference location (−1, −1). The coordinates of the upper-left corner of region 530 can become (0, 0), and the range of coordinates of region 530 can become (0, 0) to (5, 19). With such alignment, the upper-leftmost element of region 530, which represents the first input data element to be multiplied with weight data element (1, 1), overlaps with the weight data element when filter array 504 is at stride location (0, 0). For weight data element (1, 1), region 530, as well as stride pattern 550, overlaps with the original input data array 502 but not the zero padding. The first input data element starts at coordinates (0, 0), and a total of 30 input data elements can be fetched. Moreover, since there is no zero input data elements, there is no skipping of entries of the column summation buffer.

Moreover, for weight data element (2, 2), the compiler can compute the coordinates of the upper-left corner of region 530 using Equation 8 and obtain (1, 1). That is, the compiler can shift region 530 towards right and bottom by two units from the upper-left corner of the padded input data array 502 (reference location (−1, −1). The range of coordinates of region 530 becomes (1, 1) to (6, 20). With such alignment, the upper-leftmost element of region 530, which represents the first input data element to be multiplied with weight data element (2, 2), overlaps with the weight data element when filter array 504 is at stride location (0, 0). For weight data element (2, 2), region 530, as well as stride pattern 550, overlaps with the original input data array 502 but not the zero padding. The first input data element starts at coordinates (1, 1), and a total of 27 input data elements can be fetched. Moreover, since there is no zero input data elements, there is also no skipping of entries of the column summation buffer. To maintain a rectangular shape, the 27 partial sums can be stored in a 9×3 region (which can based on a number of input data elements in a row) in the column summation buffer shifted to the left with the last column of entries skipped.

Figure 5C:
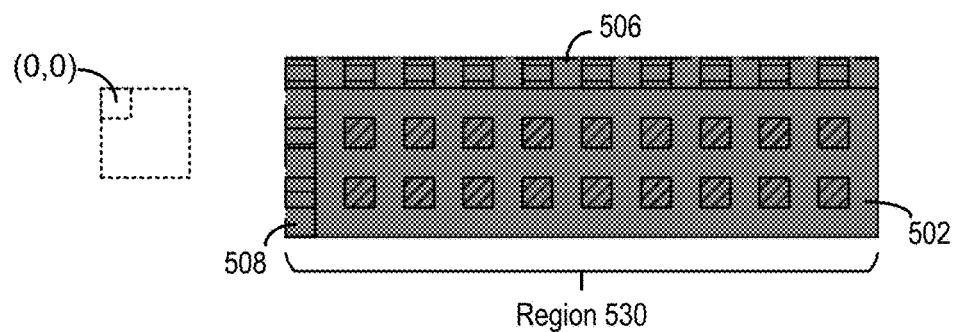
Figure 5C:
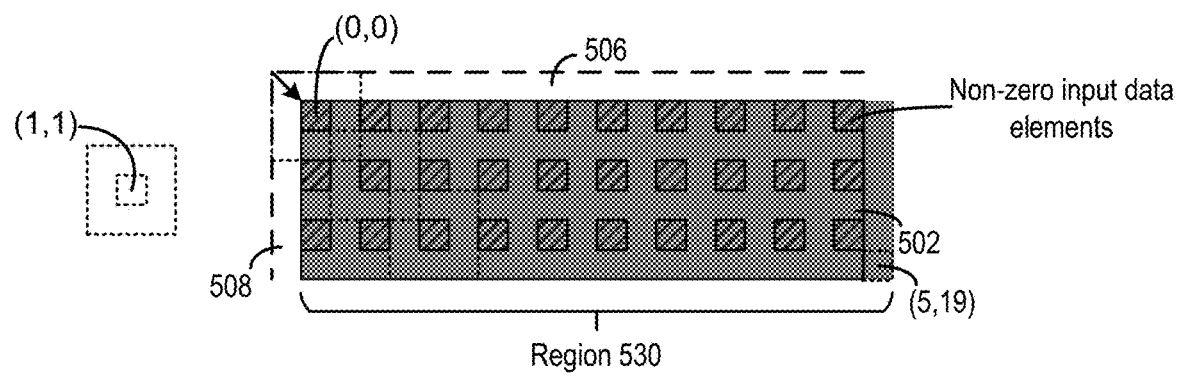
Figure 5C:
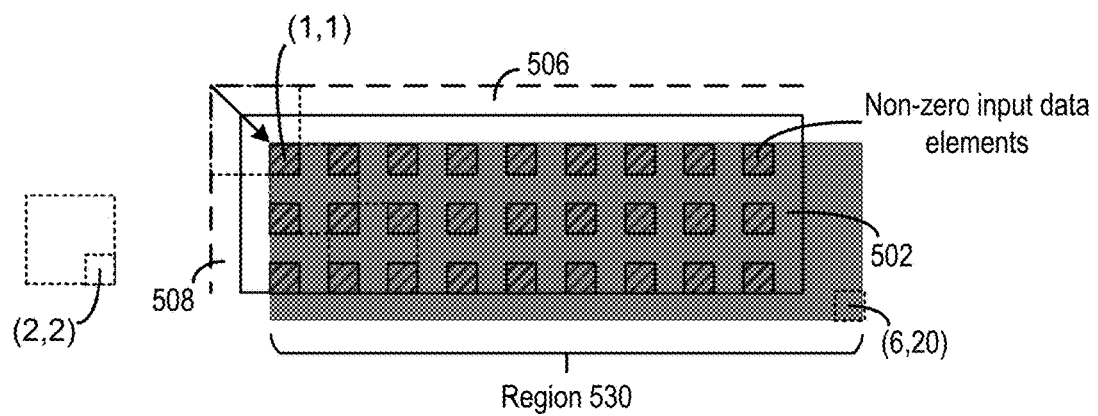

FIG. 5D illustrates examples of memory fetch parameters 430 and buffer write parameters 452 for weight data elements (0, 0), (1, 1), and (2, 2) for the convolution operations shown in FIG. 5A-FIG. 5C, as described above.

Figure 6A:
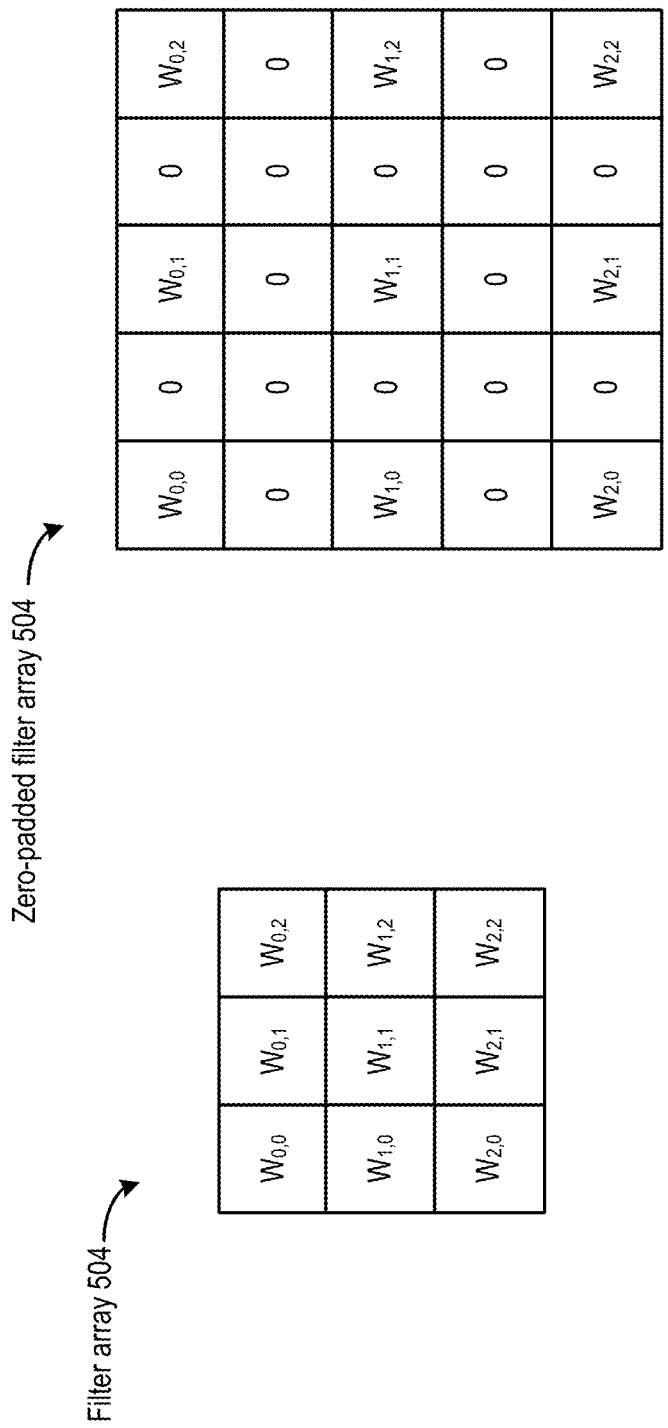
Figure 6B:
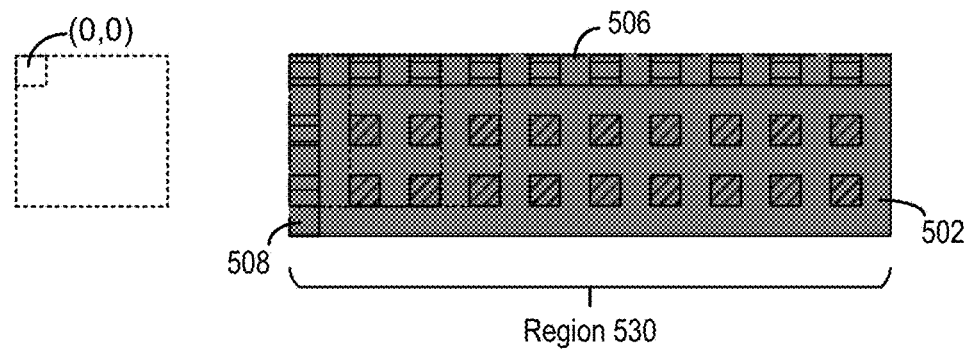
Figure 6B:
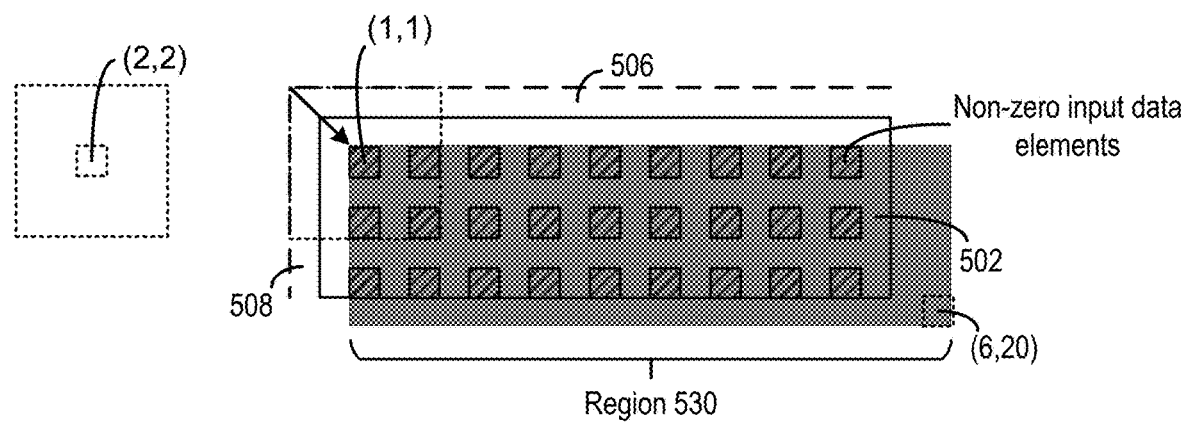
Figure 6B:
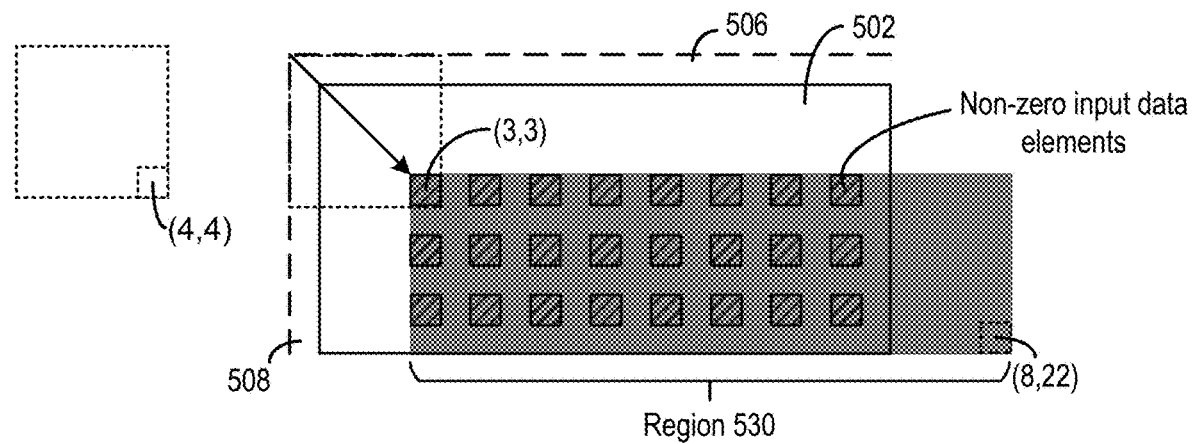

FIG. 6A-FIG. 6C illustrate example configurations of accelerator 402 to perform a dilated convolution operation. In the examples of FIG. 6A-FIG. 6C, a dilated convolution operation between filter array 504 and input data array 502 at a rate of 2 and a stride of 2 is illustrated. As shown in FIG. 6A, the effect of the dilated convolution operation can be padding a zero between neighboring weight data elements of filter array 504 to expand from 3×3 to 5×5, and performing normal convolution between the zero-padded filter array 504 and the zero-padded input data array 502.

The convolution operations described in FIG. 5B and FIG. 5C can be modified to support the dilated convolution operation. Specifically, to perform the dilated convolution operation, processing engine array 410 can load the same set of weight data elements of filter array 504, but with the selection of the subsets of input data elements for each weight data element of filter array 504, based on the target coordinates ranges of region 530, will be modified to account for the rate of the dilated convolution operation. Specifically, referring to FIG. 6B, the coordinates of the upper-left corner element of region 530, with respect to the original input data array 502, can be based on the follow equations:

$$\text{Start\_coordinates}_{dilated} = (\text{weight\_r} \times \text{rate} - \text{pad\_west}, \text{weight\_s} \times \text{rate} - \text{pad\_north}) \quad \text{(Equation 9)}$$

In Equation 9, start_coordinates$_{dilated}$ can refer to the coordinates of the upper-left corner of region 530, weight_r refers to the row coordinates of the weight data element in the original filter array without zero-padding, weight_s refers to the column coordinates of the weight data element in the original filter array without zero-padding, pad_west refers to the number of columns of zeros added to the left of input data array 502, whereas pad_north refers to the number of rows of zeros added to the top of input data array 502. The effect of Equation 9 is that for different weight data elements, the magnitude of shift of the coordinates of the upper-left corner element of region 530, which defines the coordinates of the input data element that overlaps with the weight data element of the expanded filter array 504, is scaled by the rate.

For example, referring to FIG. 6B, the weight data element (0, 0) of the expanded filter array 504 is at the same coordinates (0, 0) in the original filter array 504, therefore the upper-left corner of region 530 is aligned with the upper-left corner of zero-padded input data array 502 and have a range of target coordinates from (−1, −1) and (4, 18) with respect to the upper-leftmost element of the original input data array 502, which has the coordinates (0, 0). Same as in FIG. 5B, the number of fetch elements parameter and the number of write elements can be set to 18, whereas the destination offset parameter can be set to 11. The step is set at 2 based on the stride.

Moreover, for the weight data element (2, 2) of the expanded filter array 504, which corresponds the weight data element (1, 1) of the original filter array 504, the compiler can compute the coordinates of the upper-left corner of region 530 using Equation 9 and obtain (1, 1). That is, compared with weight data element (0, 0) (of both expanded and original filter array 504), region 530 is shifted towards right and bottom by two units from the upper-left corner of the padded input data array 502. The range of coordinates of region 530 becomes (1, 1) to (6, 20). With such alignment, the upper-leftmost element of region 530, which represents the first input data element to be multiplied with weight data element (2, 2) of the expanded filter array 504, overlaps with the weight data element when filter array 504 is at stride location (0, 0). For weight data element (2, 2), region 530, as well as stride pattern 550, overlaps with the original input data array 502 but not the zero-padding. The first input data element starts at coordinates (1, 1), and a total of 27 input data elements can be fetched. Moreover, since there is no zero input data elements, there is also no skipping of entries of the column summation buffer.

Moreover, for the weight data element (4, 4) of the expanded filter array 504, which corresponds the weight data element (2, 2) of the original filter array 504, the compiler can compute the coordinates of the upper-left corner of region 530 using Equation 9 and obtain (3, 3). That is, compared with weight data element (0, 0) (of both expanded and original filter array 504), region 530 is shifted towards right and bottom by four units from the upper-left corner of the padded input data array 502. The range of coordinates of region 530 becomes (3, 3) to (8, 22). With such alignment, the upper-leftmost element of region 530, which represents the first input data element to be multiplied with weight data element (4, 4) of the expanded filter array 504, overlaps with the weight data element when filter array 504 is at stride location (0, 0). For weight data element (4, 4), region 530, as well as stride pattern 550, overlaps with the original input data array 502 and not with the zero padding. The first input data element starts at coordinates (3, 3), and a total of 24 input data elements can be fetched. Moreover, since there is no zero input data elements, there is also no skipping of entries of the column summation buffer.

FIG. 6C illustrates examples of memory fetch parameters 430 and buffer write parameters 452 for weight data elements (0, 0), (2, 2), and (4, 4) of the zero-padded filter array 504 for the dilated convolution operations shown in FIG. 6A-FIG. 6B, as described above.

Figure 7:
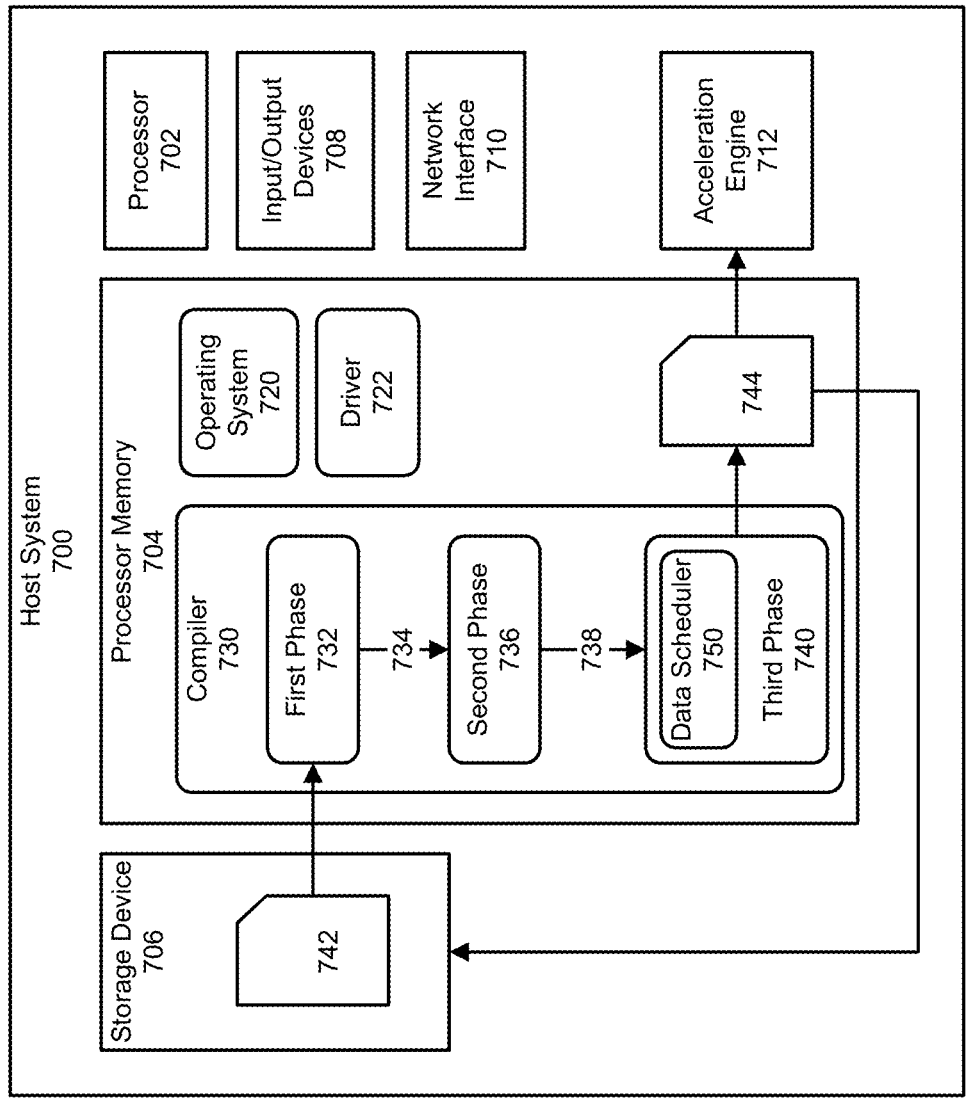
FIG. 7 includes a block diagram that illustrates an example of a host system, according to certain aspects of the present disclosure.

FIG. 7 includes a block diagram illustrating an example of a host system 700 on which a compiler 730, such as is described herein, can run. The illustrated host system 700 is an example of a computing device, and includes a processor 702, a processor memory 704, at least one storage device 706, various Input/Output (I/O) devices 708, and at least one network interface 710. In the example of FIG. 7, the host system 700 also includes an acceleration engine 712, which can include accelerator 402 of FIG. 4A-FIG. 4C. In various examples, the host system 700 can be implemented as a server in a data center, a desktop computer, a laptop computer, a tablet computer, or a smartphone, among other examples. In some examples, operations or components discussed below as performed or included in the host system 700 can be performed or included in other computer devices. For example, the compiler 730 can execute on the host system 700 while the acceleration engine 712 is located at a different host system.

The processor 702 is an integrated circuit device that can execute program code, in the form of instructions. The program code can be for various software applications or tools, such as an operating system 720 or the illustrated compiler 730. While the processor 702 is executing a program, the instructions for the program can be stored in the processor memory 704. The instructions can also be stored elsewhere, such as on the storage device 706, and can be loaded into the processor memory 704 when needed by the processor 702. The processor 702 can also use the processor memory 704 for temporary storage of other data on which the processor 702 is operating. In various examples, the processor memory 704 is a volatile memory type, such as a type of Random Access Memory, though non-volatile memory types can, alternatively or additionally, be used for the processor memory 704.

The storage device 706 is an example of a device that can include non-volatile memory. For example, the storage device 706 can be a magnetic disk drive, a solid state drive, or an optical drive, among other examples. The storage device 706 can further be non-transitory, such that program code and other data stored on the storage device 706 remains present when the storage device 706 is not powered on.

The storage device 706 is one example of a peripheral device, which are components that can be coupled to the host system 700 to add functionality to the host system 700. Other examples of peripheral devices include the Input/Output devices 108 and the network interface 710. The Input/Output devices 708 can include user input and output devices, such as keyboards, mice, touch screens, microphones, display screens, speakers, printers, and scanners, among other examples. The network interface 710, which can be implemented using a network interface card, can provide access to one or more networks. The network interface 710 can include, for example, a physical port for connecting a network cable and/or wireless antennas for communicating with W1-Fi and/or cellular networks. The network interface 710 can also be described as an I/O device.

The acceleration engine 712 is also another type of peripheral device or I/O device. The acceleration engine 712 is a device that is purpose built to perform certain operations that can be performed by the processor 702, but can be performed faster by the acceleration engine 712. For example, the acceleration engine 712 can be a neural network accelerator, and, as such, may be able to perform the large scale, parallel computations of a neural network more efficiently than when the computations are performed by the processor 702. As another example, the acceleration engine 712 can be a graphics processing unit (GPU), and may be optimized to perform the computations needed for graphics rendering. Other examples of devices that can be implemented by the acceleration engine 712 include cryptographic accelerators, compression and decompression accelerators, 3-D accelerators, regular expression accelerators, security accelerators, and others.

In various examples, the acceleration engine 712 can execute program code to perform certain operations. For example, when the acceleration engine 712 is a neural network accelerator, the acceleration engine 712 can be programmed to execute a particular neural network, such as one that performs image recognition or one that performs machine translation. As a further example, to support the execution of a neural network, the acceleration engine 712 can be programmed to perform operations such as copying data for the neural network from processor memory 704 (for example) into the acceleration engine 712, copying input data for the neural network from processor memory 704 into the acceleration engine 712, and/or copying results from the acceleration engine 712 into the processor memory 704, among other examples.

To generate program code for the acceleration engine 712, in various examples, the host system 700 can execute the compiler 730. Compilers, in general, are software programs that translate program code written in a human-readable language into a format (e.g., machine instructions) that can be read and processed by an integrated circuit device. In the example of FIG. 7, the acceleration engine 712 is a neural network accelerator and the compiler 730 is for compiling a neural network description into instructions to be executed by the acceleration engine 712. When the acceleration engine 712 implements a different type of accelerator, another compiler can be used.

The compiler 730 can be activated, for example, when the operating system 720 receives keyboard, mouse, touchscreen, voice commands, or other inputs from the Input/Output devices 708. The inputs can further include parameters for the compiler 730, such as the input code 742 to compile and configuration options for the compilation process. Once the compiler 730 is activated, the processor 702 can load the instructions for the compiler 730 into the processor memory 704, and can execute the instructions.

In the example of FIG. 7, the compiler 730 includes a first stage 732, a second stage 736, and a third stage 740, which each perform different operations to produce compiled code 144. In other examples, the compiler 730 can combine the operations of the first stage 732, second stage 736, and/or third stage 740 into fewer stages, or can divide the operations of one of the stages into multiple stages.

The first stage 732 can receive and process input code 742. The input code 742 can describe a program in a high-level programming language, such as Java, C++, or Tensorflow, among many other examples. The input code 742 can describe, for example, steps to perform image recognition, speech recognition, machine translation, or other operations. The input code 742 can be obtained, for example, from the storage device 706. Alternatively, though not illustrated here, the input code 742 may be located in the processor memory 704 or can be obtained from a network location, using the network interface 710. Processing of the input code 742 can include sorting the operations described in the input code 742 into layers, where the outputs of one layer provide the inputs to a next layer. Processing can also include identifying steps to be performed by the processor 702, rather than by the acceleration engine 712. For example, the processor 702, through the execution of a driver 722, may need to perform steps such as configuring Direct Memory Access (DMA) descriptors for moving data into or out of the acceleration engine 712, among other examples.

The output 734 of the first stage 732 can be organized, for example, in the layers, nodes, and connections between nodes of a neural network. The second stage 736 can perform intermediate processing on this output 734. For example, the operations performed in any one layer, or at any one node in a layer, may be too many for the acceleration engine 712 to perform at the same time. The acceleration engine 712 may, for example, have a limited amount of locale storage space for the data needed for a computation, or the computations may be more than the acceleration engine 712 can perform at one time. In this example, the first stage 732 can break the operations of the layer or node down into smaller operations, which can fit into the acceleration engine's local memory and/or can fit into the computing capacity of the acceleration engine 712. Processing of the output 734 of the first stage 732 can include other steps, such as scheduling, or determining the order in which the acceleration engine 712 and/or processor 702 will perform operations, among other examples.

In various examples, the output 738 of the second stage 736 includes the various steps to be performed by components of the acceleration engine 712, in the order that the steps are to be performed. The output 738 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 740 can operate on the output 738 of the second stage 736, and perform various steps before producing the instructions that are to be executed by the acceleration engine 712. These steps can include, for example, removing redundant dependencies, resolving or handling dependencies between nodes by inserting synchronization instructions into the code, identifying possibly optimizations in memory usage or memory bandwidth usage, and other operations.

In some examples, the third stage 740 can include a data scheduler 750 to schedule movement of data, such as input data and weight data, in acceleration engine 712 to support various operations, such as convolution operation and dilated convolution as described above. For example, data scheduler 750 can obtain an instruction (e.g., from the data flow graph) to perform a convolution operation (e.g., normal convolution, dilated convolution, etc.) between an input data array and a filter array to generate a convolution output array. Based on the size of the summation buffer at acceleration engine 712, data scheduler 750 can determine the output tiles that fit into the summation buffer, and can determine sequences of instructions to stage the convolution operations to generate one output tile at a time. For each instruction, data scheduler 750 can determine the sequence of loading the weight data elements of the filter array into processing engine array 410, and determine subsets of the input data to be loaded into processing engine 410 for each weight data element based on the techniques described above in FIG. 5A-FIG. 6C, such as performing a projection operation from the summation buffer to determine a region of input data array (e.g., region 530) based on stride, shifting the region with respect to the input data array for different weight data elements based on the coordinates of the weight data elements and the rate of dilated convolution, overlaying a stride pattern onto the shifted region, and determining coordinates of the input data elements overlapping with the stride pattern, which are also the subset of input data to be provided to processing engine array 410 to multiply with the weight data element. Data scheduler 750 can translate the coordinates to addresses and include the addresses as part of the memory fetch parameters 430 instructions. Moreover, based on the projection operation, data scheduler 750 can also determine the set of buffer write parameters 452 including a destination offset and a number of write elements. Data scheduler 750 can then generate instructions to control acceleration engine 712 to load the weight data elements and the corresponding subsets of input data elements to perform the convolution operations.

The output of the third stage 740 is compiled code 744, which may include machine instructions in binary format. In some examples, the compiled code 744 can be stored in the processor memory 704. Alternatively or additionally, the compiled code 744 can be copied to the storage device 706 or to a network location. As noted above, the acceleration engine 712 may be located at a different host system, in which case the compiled code 744 can be sent over the network interface 710 to the other host system.

In the example of FIG. 7, the host system 700 can be executing a driver 722, which can also be referred to as a device driver or runtime driver, that manages the acceleration engine 712. The driver 722 can provide an interface between applications executing on the host system 700 (or on another host system) and the acceleration engine 712. For example, the driver 722 can provide an Application Program Interface (API) that defines functions for feeding input data to the acceleration engine 712 and defining the operation to perform on the input data. In this and other examples, the driver 722 can configure the acceleration engine 712 to perform the operation. For example, the driver 722 can identify a neural network that the acceleration engine 712 is to execute, as well as the location in the processor memory 704 or on the storage device 706 where the compiled code 744 for the neural network is located. The driver 722 can further load into the acceleration engine 712 or cause the acceleration engine 712 to load the compiled code 144, can load or cause the acceleration engine 712 to load the input data on which the neural network is to operate, and/or can cause the acceleration engine 712 to being executing on the input data. Once the acceleration engine 712 has finished, the acceleration engine 712 can notify the driver 722, and the driver 722 can deliver a result back to the application that requested the result.

Figure 8:
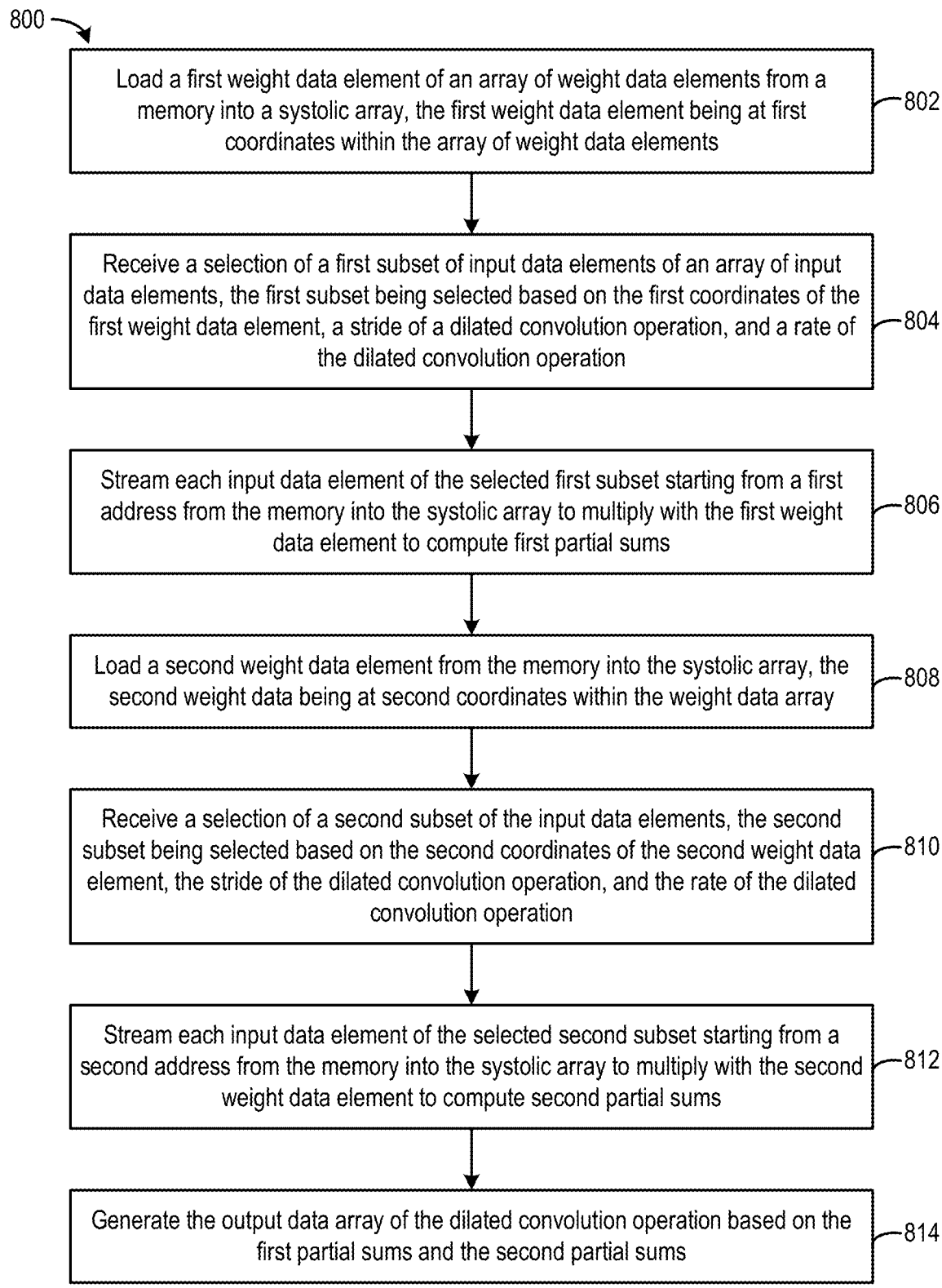
FIG. 8 illustrates an example method of performing a dilated convolution operation at a neural network processor, according to certain aspects of the present disclosure.

FIG. 8 illustrates a flowchart of an example method 800 for performing a dilated convolution operation. Method 800 can be performed by, for example, various components of accelerator 402 including memory subsystem 404, processing engine array 410, summation buffer 412, and controller 422.

Method 800 begins with step 802, in which a controller (e.g., controller 422) can load a first weight data element of an array of weight data elements from a memory (e.g., memory subsystem 404) into a systolic array (e.g., processing engine array 410), the first weight data element being at first coordinates within the array of weight data elements. The first weight data element can be obtained from memory subsystem 404 based on the first coordinates. The weight data elements can be stored in memory subsystem 404 in addresses that reflect the coordinates the weight data elements in the array of weight data elements. Controller 422 can be provided with an address of the first weight data element in a first computation instruction, and can obtain the first weight data element based on the address from memory subsystem 404 upon executing the first computation instruction. Moreover, as described above, each processing engine 411 can store a weight data element, and the controller can send the first weight data element to a processing engine 411 for storage.

In step 804, the controller can select a first subset of input data elements of an array of input data elements based on the first coordinates of the first weight data element in the array of weight data elements, a stride of the dilated convolution operation, and a rate of the dilated convolution operation. The first subset of input data elements are to be multiplied with the first weight data element at the processing engine 411 to generate first partial sums, which can be forwarded to a column summation buffer (e.g., column summation buffer 442) of summation buffer 412. The first subset can be selected based on the first computation instruction including a first set of memory fetch parameters 430, which can include a start address, step, and number of elements. The start address and the number of elements can reflect input data elements that overlap with the first weight data element when the array of weight data elements is at various stride locations within the array of the input data elements in the dilated convolution operation. The determination of the first subset of input data elements can be based on a projection operation. Specifically, the dimensions of the summation buffer (e.g., numbers of columns and rows) can define an output tile comprising output data elements of a first region in the output data array. The first region can be defined by a range of actual coordinates in the output data array. Based on the projection operation, which takes into the first region of output data array coordinates and a stride of the dilated convolution, the compiler can determine a second region comprising input data elements to be convolved with the first weight data element. The second region can be defined by a range of target coordinates of input data elements. The second region (and the range of target coordinates) can be shifted by an offset based on the coordinates of the first weight data element in the weight data array and a scaling factor based on the rate of the dilated convolution operation. The compiler can then align a stride pattern with the shifted second region to identify locations of the second region that overlap with the stride pattern. The stride pattern defines locations of input data elements that overlaps with the weight data element and reflects the stride of the dilated convolution operation. Based on the overlap, the compiler can determine a set of target coordinates of the overlapping input data elements. The start address of the first subset can be determined based on coordinates of the first overlapping input data elements, whereas a count of the overlapping input data elements can set the Number of fetch elements parameter. The step parameter is set to two based on the stride pattern, which can reflect the stride of the dilated convolution operation.

In step 806, the controller can stream each input data element of the first subset starting from a first address from the memory into the systolic array to multiply with the first weight data element to compute first partial sums. The input data elements can be sent, sequentially, to the processing engine 411 which stores the first weight data element in step 802. The processing engine 411 can multiply the each input data element with the first weight data element to generate the first partial sums. The first address can be the start address of the first subset described above. The first partial sums can be sent to first destination addresses in the column summation buffer based on the first computation instruction including a first set of buffer write parameters 452, which may include a destination offset, a step, and a number of write elements. The first partial sums can be added to the data stored at the first destination addresses. The first set of buffer write parameters 452 can be based on the shifted stride pattern as well, as described in FIG. 6B.

In step 808, the controller can load a second weight data element of the array of weight data elements from memory subsystem 404 into processing engine array 410, the second weight data element being at second coordinates within the array of weight data elements. The second weight data element can be obtained from memory subsystem 404 based on the second coordinates. Controller 422 can be provided with an address of the second weight data element in a second computation instruction, and can obtain the second weight data element based on the address from memory subsystem 404 upon executing the second computation instruction. Moreover, the second weight data element can replace the first weight data element stored in the processing engine 411.

In step 810, the controller can select a second subset of input data elements of the array of input data elements based on the second coordinates of the second weight data element in the array of weight data elements, the stride of the dilated convolution operation, and the rate of the dilated convolution operation. The second subset of input data elements are to be multiplied with the second weight data element at the processing engine 411 to generate second partial sums, which can be forwarded to the column summation buffer. The second subset can be selected based on the second computation instruction including a second set of memory fetch parameters 430. The second subset can be those input data elements that overlap with the second weight data element when the array of weight data elements is at various stride locations within the array of the input data elements in the dilated convolution operation. The determination of the second subset of input data elements can be similar to as described in step 804.

In step 812, the controller can stream each input data element of the second subset starting from a second address from the memory into the systolic array to multiply with the second weight data element to compute the second partial sums. The input data elements can be sent, sequentially, to the processing engine 411 which stores the second weight data element in step 812. The processing engine 411 can multiply the each input data element with the second weight data element to generate the second partial sums. The second address can be the start address of the second subset described above. The second partial sums can be sent to second destination addresses in the column summation buffer based on the second computation instruction including a second set of buffer write parameters 452. The second partial sums can be added to the data stored at the second destination addresses, some or all of which can overlap with the first destination addresses. The second set of buffer write parameters 452 can be based on the shifted stride pattern, as described in FIG. 6B.

In step 814, the controller can generate an output data array of the transposed convolution operation based on the first partial sums and the second partial sums. As described above, some of the first destination addresses and second destination addresses may overlap, and some of the output data elements of the output data array may comprise sums of the first partial sums and the second partial sums. Other output data elements of the output data array may be formed by superposition of the first partial sums and the second partial sums.

Figure 9:
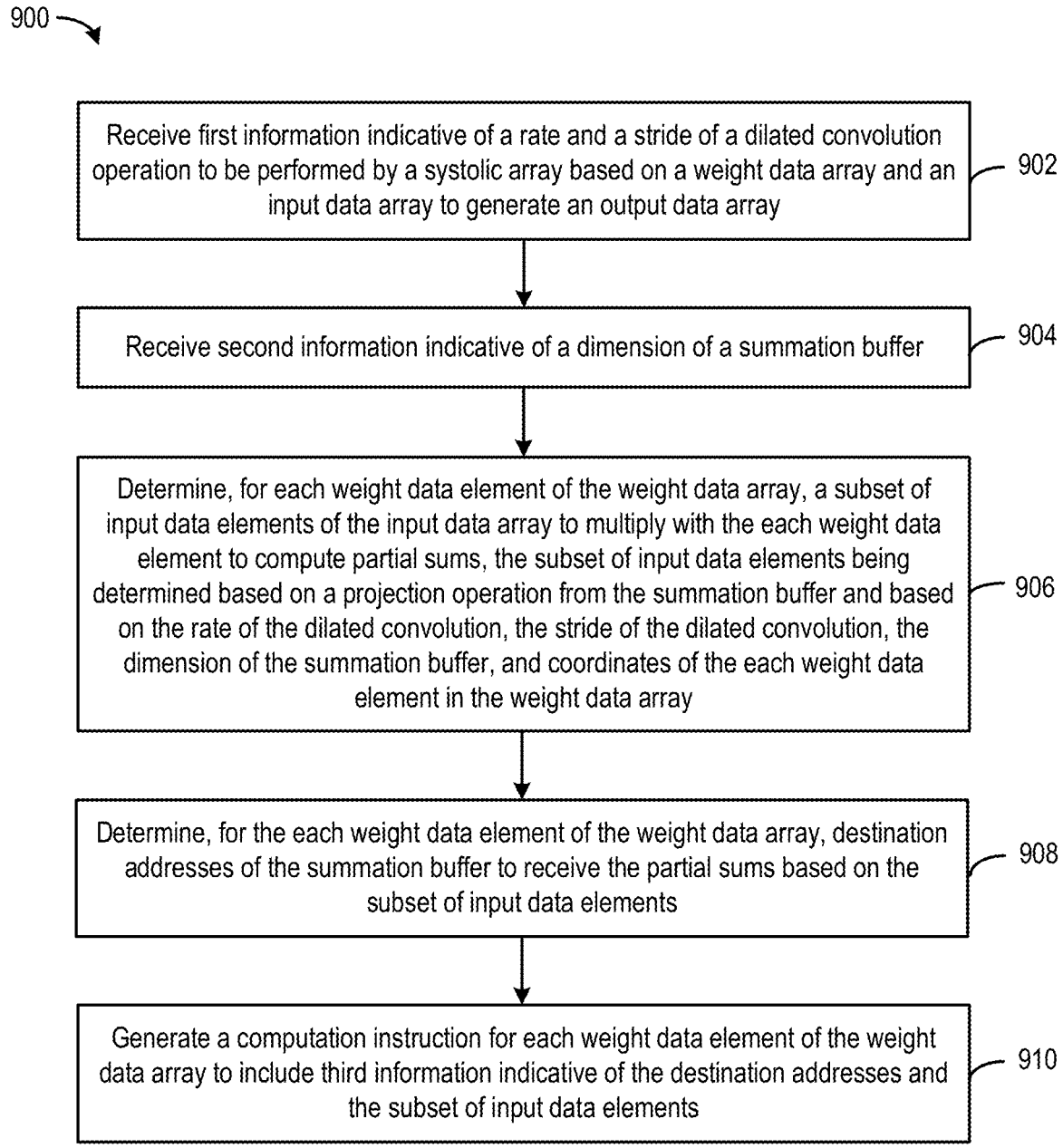
FIG. 9 illustrates an example method of preparing instructions for a neural network processor to perform a dilated convolution operation, according to certain aspects of the present disclosure.

FIG. 9 illustrates a flowchart of an example method 900 of generating instructions for a neural network processor to perform a dilated convolution operation. Method 900 can be performed by a compiler, such as compiler 830 of FIG. 8.

Method 900 starts in step 902, in which the compiler can receive first information indicative of a stride and a rate of a dilated convolution operation to be performed by a systolic array (e.g., processing engine array 410) based on a weight data array and an input data array to generate an output data array. The first information can be received from, for example, input code 842 which can represent an application (an image processing operation, etc.) that uses the results of the dilated convolution operation.

In step 904, the compiler can receive second information indicative of a dimension of a summation buffer, such as column summation buffer 442. The summation buffer accumulates and stores partial sums from the systolic array for the dilated convolution operation. The second information can also be received from, for example, input code 842. As described above, the dimension information can be used to determine an output tile and, via a projection operation, can be used to determine a subset of the input data elements of the input data array for each weight data element of the weight data array.

In step 906, the compiler can determine, for each weight data element of the weight data array, a subset of input data elements of the input data array to multiply with the each weight data element to compute the partial sums. The subset of input data elements can be determined based on a projection operation. Referring back to FIG. 5B and FIG. 5C, the dimensions of the summation buffer (e.g., numbers of columns and rows) can define an output tile comprising output data elements of a first region in the output data array. The first region can be defined by a range of actual coordinates in the output data array. Based on a projection operation, which takes into the first region of output data array coordinates and a stride of the dilated convolution, the compiler can determine a second region comprising input data elements to be convolved with the first weight data element. The second region can be defined by a range of target coordinates of input data elements. The second region (and the range of target coordinates) can be shifted by an offset based on the coordinates of the first weight data element in the weight data array and a scaling factor based on the rate of the dilated convolution operation. The compiler can then align a stride pattern with the shifted second region to identify locations of the second region that overlap with the stride pattern. The stride pattern defines locations of input data elements that overlaps with the weight data element and reflects the stride of the dilated convolution operation. Based on the overlap, the compiler can determine a set of target coordinates of the overlapping input data elements. After determining the set of target coordinates of the overlapping input data elements for the first weight data element, the compiler can perform a coordinates-to-address mapping operation to determine the addresses, including a start address, of the first subset of input data elements in the memory, as well as a count of the addresses which can indicate a count of the first subset of input data elements.

In step 908, the compiler can determine, for the each weight data element of the weight data array, destination addresses of the summation buffer to receive the partial sums, the destination addresses being determined based on the subset of input data elements for the each weight data element determined in step 906. For example, referring to FIG. 6A-FIG. 6C, based on the coordinates of the subset of input data elements, the compiler can determine a number of zero partial sums, a number of the partial sums to be sent to the summation buffer, etc. Based on these information, the compiler can determine a start destination address as well as a count of destination addresses for receiving the partial sums.

In step 910, the compiler can generate a computation instruction for each weight data element of the weight data array to include third information indicative of the destination addresses and the subset of input data elements. The third information may include, for example, a start source address and a count of the input data elements based on the projection operation in step 906. The information may also include, for example, a start destination address, a step of one to indicate no gap between adjacent destination addresses, and a count of the destination addresses, based on the operation in step 908. The computation instruction may also include an address of the each weight data element in the memory based on the coordinates of the each weight data element in the weight data array.

Figure 10:
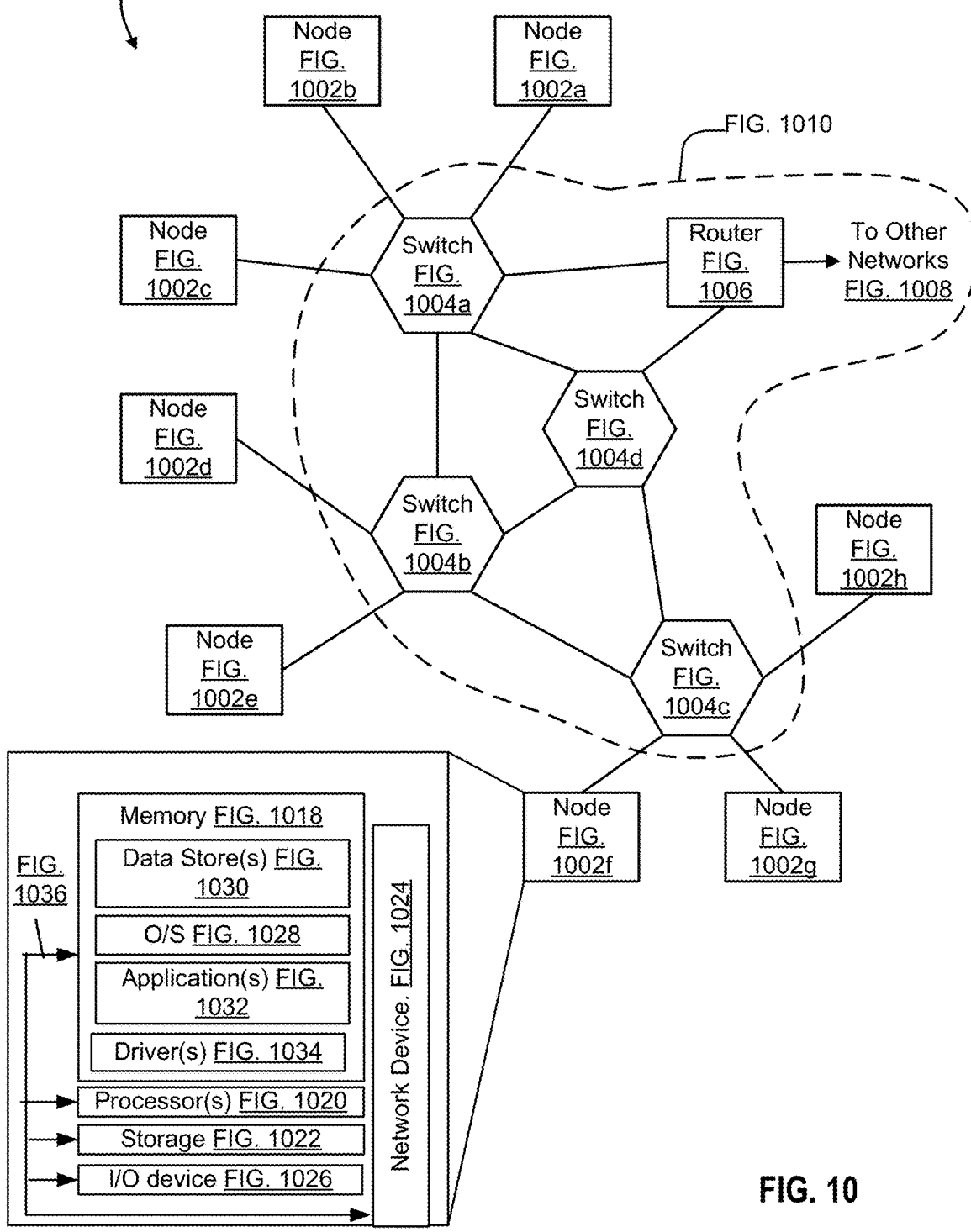
FIG. 10 includes a diagram of an example network.

FIG. 10 includes a diagram of an example network 1000, which can include one or more host systems, such as the host system illustrated in FIG. 7. For example, the example network 1000 of FIG. 10 includes multiple nodes 1002a-1002h, one or more of which can be a host system such as is illustrated in FIG. 7. Others of the nodes 1002a-1002h can be other computing devices, each of which include at least a memory for storing program instructions, a processor for executing the instructions, and a network interface for connecting to the network 1000.

In various examples, the network 1000 can be used to process data. For example, input data can be received at one of the nodes 1002a-1002h or from other networks 1008 with which the network 1000 can communicate. In this example, the input data can be directed to a node in the network 1000 that includes an acceleration engine, for the acceleration engine to operate on and produce a result. The result can then be transferred to the node or other network from which the input data was received. In various examples, input data can be accumulated from various sources, including one or more of the nodes 1002a-1002h and/or computing devices located in the other networks 1008, and the accumulated input data can be directed to one or more host systems in the network 1000. Results from the host systems can then be distributed back to the sources from which the input data was gathered.

In various examples, one or more of the nodes 1002a-1002h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 10, the nodes 1002a-1002h are connected to one another using a switched architecture with point-to point links. The switched architecture includes multiple switches 1004a-1004d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1004a-1004d of FIG. 10 may be connected to the nodes 1002a-1002h and provide multiple paths between any two nodes.

The network 1000 may also include one or more network devices for connection with other networks 1008, such as a router 1006. Routers use headers and forwarding tables to determine the best path for forwarding the packets, and use protocols such as internet control message protocol (ICMP) to communicate with each other and configure the best route between any two devices. The router 1006 of FIG. 10 can be used to connect to other networks 1008 such as subnets, LANs, wide area networks (WANs), and/or the Internet.

In some examples, network 1000 may include anyone or a combination of many different types of networks, such as cable networks, the Internet, wireless networks, cellular networks and other private and/or public networks. The interconnected switches 1004a-1004d and the router 1006, if present, may be referred to as a switch fabric 1010, a fabric, a network fabric, or simply a network. In the context of a computer network, terms "fabric" and "network" may be used interchangeably herein.

The nodes 1002a-1002h may be any combination of host systems, processor nodes, storage subsystems, and I/O chassis that represent user devices, service provider computers or third party computers.

User devices may include computing devices to access an application 1032 (e.g., a web browser or mobile device application). In some aspects, the application 1032 may be hosted, managed, and/or provided by a computing resources service or service provider. The application 1032 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1008. Additionally, the user device(s) may be part of the distributed system managed by, controlled by, or otherwise part of the service provider computer(s) (e.g., a console device integrated with the service provider computers).

The node(s) of FIG. 10 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1032 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1002*a*-1002*h* may include at least one memory 1018 and one or more processing units (or processor(s) 1020). The processor(s) 1020 may be implemented in hardware, computer-executable instructions, firmware, or combinations thereof. Computer-executable instruction or firmware implementations of the processor(s) 1020 may include computer-executable or machine-executable instructions written in any suitable programming language to perform the various functions described.

In some instances, the hardware processor(s) 1020 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1018 may store program instructions that are loadable and executable on the processor(s) 1020, as well as data generated during the execution of these programs. Depending on the configuration and type of the node(s) 1002*a*-1002*h*, the memory 1018 may be volatile (such as RAM) and/or non-volatile (such as ROM, flash memory, etc.). The memory 1018 may include an operating system 1028, one or more data stores 1030, one or more application programs 1032, one or more drivers 1034, and/or services for implementing the features disclosed herein.

The operating system 1028 may support nodes 1002*a*-1002*h* basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1028 may also be a proprietary operating system.

The data stores 1030 may include permanent or transitory data used and/or operated on by the operating system 1028, application programs 1032, or drivers 1034. Examples of such data include web pages, video data, audio data, images, user data, and so on. The information in the data stores 1030 may, in some implementations, be provided over the network(s) 1008 to user devices. In some cases, the data stores 1030 may additionally or alternatively include stored application programs and/or drivers. Alternatively or additionally, the data stores 1030 may store standard and/or proprietary software libraries, and/or standard and/or proprietary application user interface (API) libraries. Information stored in the data stores 1030 may be machine-readable object code, source code, interpreted code, or intermediate code.

The drivers 1034 include programs that may provide communication between components in a node. For example, some drivers 1034 may provide communication between the operating system 1028 and additional storage 1022, network device 1024, and/or I/O device 1026. Alternatively or additionally, some drivers 1034 may provide communication between application programs 1032 and the operating system 1028, and/or application programs 1032 and peripheral devices accessible to the service provider computer. In many cases, the drivers 1034 may include drivers that provide well-understood functionality (e.g., printer drivers, display drivers, hard disk drivers, Solid State Device drivers). In other cases, the drivers 1034 may provide proprietary or specialized functionality.

The service provider computer(s) or servers may also include additional storage 1022, which may include removable storage and/or non-removable storage. The additional storage 1022 may include magnetic storage, optical disks, solid state disks, flash memory, and/or tape storage. The additional storage 1022 may be housed in the same chassis as the node(s) 1002*a*-1002*h* or may be in an external enclosure. The memory 1018 and/or additional storage 1022 and their associated computer-readable media may provide non-volatile storage of computer-readable instructions, data structures, program modules, and other data for the computing devices. In some implementations, the memory 1018 may include multiple different types of memory, such as SRAM, DRAM, or ROM.

The memory 1018 and the additional storage 1022, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1018 and the additional storage 1022 are examples of computer storage media. Additional types of computer storage media that may be present in the node(s) 1002*a*-1002*h* may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1002*a*-1002*h*. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1002*a*-1002*h* may also include I/O device(s) 1026, such as a keyboard, a mouse, a pen, a voice input device, a touch input device, a display, speakers, a printer, and the like. The node(s) 1002a-1002h may also include one or more communication channels 1036. A communication channel 1036 may provide a medium over which the various components of the node(s) 1002a-1002h can communicate. The communication channel or channels 1036 may take the form of a bus, a ring, a switching fabric, or a network.

The node(s) 1002a-1002h may also contain network device(s) 1024 that allow the node(s) 1002a-1002h to communicate with a stored database, another computing device or server, user terminals and/or other devices on the network(s) 1000.

In some implementations, the network device 1024 is a peripheral device, such as a PCI-based device. In these implementations, the network device 1024 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1024 may be connected to a computing system using a PCIe interface.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method, comprising:
    loading a first weight data element of an array of weight data elements from a memory into a systolic array, the first weight data element being at first coordinates within the array of weight data elements;
    receiving a selection of a first subset of input data elements of an array of input data elements, the first subset being selected based on the first coordinates of the first weight data element, a stride of a dilated convolution operation, and a rate of the dilated convolution operation, wherein the first subset is further selected based on a set of parameters that include a first address of the first subset in the memory, a gap between input data elements of the first subset of input data elements, or a count of the first subset of input data elements;
    streaming each input data element of the selected first subset starting from the first address from the memory into the systolic array to multiply with the first weight data element to compute first partial sums;

loading a second weight data element from the memory into the systolic array, the second weight data being at second coordinates within the array of weight data element;

receiving a selection of a second subset of input data elements of the array of input data elements, the second subset being selected based on the second coordinates of the second weight data element, the stride of the dilated convolution operation, and the rate of the dilated convolution operation;

streaming each input data element of the selected second subset starting from a second address from the memory into the systolic array to multiply with the first weight data element to compute second partial sums; and generating an output data array of the dilated convolution operation based on the first partial sums and the second partial sums.

2. The method of claim 1, further comprising:

accumulating first partial sums with first data stored at first consecutive addresses of a summation buffer;

accumulating second partial sums with second data stored at second consecutive addresses of the summation buffer; and generating the output data array based on data stored at the first and second consecutive addresses after accumulating the first partial sums and the second partial sums, wherein the count of the first subset of input data elements and a count of the second subset of input data elements are based on a size of the summation buffer and the rate of the dilated convolution operation.

3. The method of claim 2, wherein the dilated convolution is between zero-padded two-dimensional image data comprising the array of input data elements and the array of weight data elements;

wherein the method further comprises: storing, at the summation buffer, the first partial sums starting at a third address based on a number of zero-padded elements of the zero-padded image data that overlap with the first weight data element in the dilated convolution operation.

4. The method of claim 3, wherein the dilated convolution between the zero-padded two-dimensional image data and the array of weight data elements does not involve multiplication between zero-padded elements of the zero-padded image data and the array of weight data elements; and wherein the second partial sums are added to data elements stored in the summation buffer starting at a fourth address, the difference between the fourth address and the third address corresponding to the number of zero-padded elements that overlap with the first weight data element in the dilated convolution operation.

5. The method of claim 4, further comprising:

executing a set of instructions to perform the dilated convolution operation, wherein the set of instructions includes:

first information indicating the first address of the memory, the count of the first subset of input data elements, and the gap between input data elements of the first subset of input data elements; and second information indicating the second address of the memory, the count of the second subset of input data elements, and a gap between input data elements of the second subset of input data elements;

wherein receiving the selection of the first subset of input data elements comprises extracting the first information from the set of instructions; and wherein receiving the selection of the second subset of input data elements comprises extracting the second information from the set of instructions.

6. A non-transitory computer readable medium storing instructions that, when executed by one or more hardware processors, cause the one or more hardware processors to:

load a first weight data element of an array of weight data elements from a memory into a systolic array;

select a first subset of input data elements to be loaded from the memory into the systolic array, the first subset being selected based on information indicating a rate of a dilated convolution operation and coordinates of the first weight data element within the array of weight data elements;

control the systolic array to perform first computations based on the first weight data element and the first subset to generate first partial sums;

control a summation buffer to accumulate the first partial sums;

load a second weight data element of the array of weight data elements from the memory into the systolic array;

select a second subset of the input data elements to be loaded from the memory into the systolic array;

control the systolic array to perform second computations based on the second weight data element and the second subset to generate second partial sums;

control the summation buffer to accumulate the second partial sums; and generate output data elements of an output data array based on the first partial sums and the second partial sums.

7. The non-transitory computer readable medium of claim 6, wherein the first subset is selected based on a stride of the dilated convolution operation.

8. The non-transitory computer readable medium of claim 7, wherein the input data elements are stored in a contiguous address space within the memory.

9. The non-transitory computer readable medium of claim 8, wherein the first subset of the input data elements is selected based on skipping a number of input data elements between each selected input data element, the number of input data elements skipped being based on the stride.

10. The non-transitory computer readable medium of claim 8, wherein the instructions include a plurality of parameters comprising:

a starting source address of the subset of input data elements in the memory;

a skip parameter that indicates the number of input data elements skipped; and a number of the subset of the input data elements.

11. The non-transitory computer readable medium of claim 10, wherein the starting source address is based on the rate of the dilated convolution operation.

12. The non-transitory computer readable medium of claim 6, wherein a first size of the first subset of the first input data elements and a second size of the second subset of the first input data elements are selected based on a size of the summation buffer.

13. The non-transitory computer readable medium of claim 12, wherein the instructions, when executed by one or more hardware processors, cause the one or more hardware processors to store the first partial sums at an address of the buffer based on a number of zero output data elements included in the output data elements.

14. The non-transitory computer readable medium of claim 13, wherein the instructions include a set of parameters including:
- a first starting source address of the first subset of the input data elements in the memory; and
- a second starting source address of the second subset of the input data elements in the memory; and
- wherein the first starting source address and the second starting source address are offset from each other based on the rate of the dilated convolution.

15. The non-transitory computer readable medium of claim 14, wherein the set of parameters includes a first starting destination address of the summation buffer to receive the first partial sums and a second starting destination address of the summation buffer to receive the second partial sums.

16. An apparatus comprising:
- a memory that stores a set of instructions;
- one or more hardware processors configured to execute the set of instructions to:
  - receive first information indicative of a rate and a stride of a dilated convolution operation to be performed by a systolic array based on a weight data array and an input data array to generate an output data array;
  - receive second information indicative of a dimension of a summation buffer;
  - determine, for each weight data element of the weight data array, a subset of input data elements of the input data array to multiply with the each weight data element to compute partial sums, the subset of input data elements being determined based on a projection operation from the summation buffer and based on the rate of the dilated convolution, the stride of the dilated convolution, the dimension of the summation buffer, and coordinates of the each weight data element in the weight data array;
  - determine, for the each weight data element of the weight data array, destination addresses of the summation buffer to receive the partial sums based on the subset of input data elements; and
  - generate a computation instruction for each weight data element of the weight data array to include third information indicative of the destination addresses and the subset of input data elements and to include fourth information indicating the address, a number of input data elements included in the subset of the input data array, or a step size in the computation instruction to enable the systolic array to load the subset of input data elements from the memory.

17. The apparatus of claim 16, wherein the one or more hardware processors are configured to execute the set of instructions to, for the each weight data element:
- determine, based on the dimension information of the summation buffer and the stride of the dilation convolution operation, a projected region that aligns a first input data element of the input data array;
- shift the projected region with respect to the first input data element of the input data array by an offset based on coordinates of the each weight data element in the weight data array and the rate of the dilated convolution;
- align a stride pattern with the shifted projected region, the stride pattern being based on a stride of the dilated convolution operation;
- determine, based on the dimension information, coordinates of input data elements of the input data array that overlap with the stride pattern; and
- determine the subset of input data elements for the each weight data element based on the coordinates.

18. The apparatus of claim 17, wherein the one or more hardware processors are configured to execute the set of instructions to determine the offset based on scaling the coordinates of the each weight data element in the weight data element by the rate of the dilated convolution.

19. The apparatus of claim 18, wherein the one or more hardware processors are configured to execute the set of instructions to, for the each weight data element:
- determine a source address of a first of the subset of the input data elements in the memory.

* * * * *